(12) United States Patent
Basir et al.

(10) Patent No.: US 12,607,475 B2
(45) Date of Patent: *Apr. 21, 2026

(54) VEHICLE COMMUNICATION SYSTEM WITH NAVIGATION

(71) Applicant: Value8 Co., Ltd., Seoul (KR)

(72) Inventors: Otman A. Basir, Waterloo (CA);
William Ben Miners, Guelph (CA)

(73) Assignee: Value8 Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/331,258

(22) Filed: May 26, 2021

(65) Prior Publication Data

US 2021/0278233 A1    Sep. 9, 2021

Related U.S. Application Data

(63) Continuation of application No. 15/967,899, filed on May 1, 2018, now Pat. No. 11,041,735, which is a continuation of application No. 11/830,575, filed on Jul. 30, 2007, now Pat. No. 9,976,865.

(60) Provisional application No. 60/834,086, filed on Jul. 28, 2006.

(51) Int. Cl.
| | |
|---|---|
| *G01C 21/36* | (2006.01) |
| *H04M 1/60* | (2006.01) |
| *H04M 1/72436* | (2021.01) |
| *H04M 1/72412* | (2021.01) |

(52) U.S. Cl.
CPC ........ *G01C 21/362* (2013.01); *H04M 1/6091* (2013.01); *H04M 1/72436* (2021.01); *H04M 1/72412* (2021.01); *H04M 2250/74* (2013.01)

(58) Field of Classification Search
CPC .. G01C 21/3608; G01C 21/362; G01D 4/004; H04M 1/271; H04M 3/4938
See application file for complete search history.

(56) References Cited

U.S. PATENT DOCUMENTS

| | | | |
|---|---|---|---|
| 3,928,724 | A | 12/1975 | Byram et al. |
| 4,083,003 | A | 4/1978 | Haemmig |
| 4,532,052 | A | 7/1985 | Weaver et al. |
| 4,591,823 | A | 5/1986 | Horvat |
| 4,989,144 | A | 1/1991 | Barnett, III |
| (Continued) | | | |

FOREIGN PATENT DOCUMENTS

| | | | |
|---|---|---|---|
| CA | 2405813 A1 | 11/2001 | |
| DE | 19920227 A1 | 11/2000 | |
| (Continued) | | | |

OTHER PUBLICATIONS

Decision on Appeal dated Mar. 31, 2017, U.S. Appl. No. 12/701,817.
(Continued)

*Primary Examiner* — Peter D Nolan
*Assistant Examiner* — Wae L Louie

(57) ABSTRACT

A vehicle communication system facilitates hands-free interaction with a mobile device in a vehicle or elsewhere. Users interact with the system by speaking to it. The system processes text and processes commands. The system supports Bluetooth wireless technology for hands-free use. The system handles telephone calls, email, and SMS text messages. The user can customize the device via a user profile stored on an Internet web server.

26 Claims, 3 Drawing Sheets

(56)        References Cited

U.S. PATENT DOCUMENTS

| 5,177,685 A | 1/1993 | Davis et al. |
| 5,246,073 A | 9/1993 | Sandiford et al. |
| 5,488,360 A | 1/1996 | Ray |
| 5,638,425 A | 6/1997 | Meador, III et al. |
| 5,760,742 A | 6/1998 | Branch et al. |
| 5,794,164 A | 8/1998 | Beckert et al. |
| 5,836,392 A | 11/1998 | Urlwin-Smith |
| 5,912,951 A | 6/1999 | Checchio et al. |
| 5,931,907 A | 8/1999 | Davies et al. |
| 5,938,706 A | 8/1999 | Feldman |
| 5,944,783 A | 8/1999 | Nieten |
| 5,963,618 A | 10/1999 | Porter |
| 5,983,108 A | 11/1999 | Kennedy, III et al. |
| 6,012,030 A | 1/2000 | French-St et al. |
| 6,041,300 A | 3/2000 | Ittycheriah et al. |
| 6,061,718 A | 5/2000 | Nelson |
| 6,088,650 A | 7/2000 | Schipper et al. |
| 6,122,682 A | 9/2000 | Andrews |
| 6,131,060 A | 10/2000 | Obradovich et al. |
| 6,147,598 A | 11/2000 | Murphy et al. |
| 6,167,253 A | 12/2000 | Farris et al. |
| 6,176,315 B1 | 1/2001 | Reddy et al. |
| 6,185,491 B1 | 2/2001 | Gray et al. |
| 6,192,364 B1 | 2/2001 | Baclawski |
| 6,192,986 B1 | 2/2001 | Urlwin-Smith |
| 6,196,317 B1 | 3/2001 | Hardy |
| 6,212,474 B1* | 4/2001 | Fowler ............... G01C 21/3629 |
| | | 701/431 |
| 6,253,122 B1 | 6/2001 | Razavi et al. |
| 6,282,495 B1 | 8/2001 | Kirkhart et al. |
| 6,295,449 B1 | 9/2001 | Westerlage et al. |
| 6,329,925 B1 | 12/2001 | Skiver et al. |
| 6,356,869 B1 | 3/2002 | Chapados et al. |
| 6,362,748 B1 | 3/2002 | Huang |
| 6,367,022 B1 | 4/2002 | Gillespie et al. |
| 6,377,825 B1 | 4/2002 | Kennedy et al. |
| 6,385,202 B1 | 5/2002 | Katseff et al. |
| 6,420,975 B1 | 7/2002 | DeLine et al. |
| 6,429,773 B1 | 8/2002 | Schuyler |
| 6,477,464 B2 | 11/2002 | McCarthy et al. |
| 6,496,107 B1 | 12/2002 | Himmelstein |
| 6,526,335 B1 | 2/2003 | Treyz et al. |
| 6,529,863 B1 | 3/2003 | Ball et al. |
| 6,553,102 B1 | 4/2003 | Fogg et al. |
| 6,559,773 B1 | 5/2003 | Berry |
| 6,574,531 B2 | 6/2003 | Tan et al. |
| 6,577,928 B2 | 6/2003 | Obradovich |
| 6,580,973 B2 | 6/2003 | Leivian et al. |
| 6,594,557 B1 | 7/2003 | Stefan et al. |
| 6,607,035 B1 | 8/2003 | Reddy et al. |
| 6,615,130 B2 | 9/2003 | Myr |
| 6,622,083 B1 | 9/2003 | Knockeart et al. |
| 6,650,997 B2* | 11/2003 | Funk .................. G01C 21/3608 |
| | | 704/E15.04 |
| 6,690,268 B2 | 2/2004 | Schofield et al. |
| 6,693,517 B2 | 2/2004 | McCarthy et al. |
| 6,697,638 B1 | 2/2004 | Larsson et al. |
| 6,714,223 B2 | 3/2004 | Asami et al. |
| 6,721,633 B2* | 4/2004 | Funk .................. H04M 3/4938 |
| | | 704/E15.04 |
| 6,724,863 B1 | 4/2004 | Bedingfield |
| 6,728,531 B1 | 4/2004 | Lee et al. |
| 6,731,239 B2 | 5/2004 | Wall et al. |
| 6,731,925 B2 | 5/2004 | Naboulsi |
| 6,738,742 B2 | 5/2004 | Badt et al. |
| 6,741,931 B1 | 5/2004 | Kohut et al. |
| 6,748,211 B1 | 6/2004 | Isaac et al. |
| 6,748,244 B2 | 6/2004 | Odinak |
| 6,759,943 B2 | 7/2004 | Lucy et al. |
| 6,764,981 B1 | 7/2004 | Eoff et al. |
| 6,775,598 B2 | 8/2004 | Bergmann et al. |
| 6,775,603 B2 | 8/2004 | Yester et al. |
| 6,782,266 B2 | 8/2004 | Baer et al. |
| 6,788,935 B1 | 9/2004 | Mckenna et al. |
| 6,788,949 B1 | 9/2004 | Bansal |
| 6,792,296 B1 | 9/2004 | Van Bosch |
| 6,812,888 B2 | 11/2004 | Drury et al. |
| 6,812,942 B2 | 11/2004 | Ribak |
| 6,839,669 B1 | 1/2005 | Gould et al. |
| 6,842,510 B2 | 1/2005 | Sakamoto |
| 6,865,460 B2 | 3/2005 | Bray et al. |
| 6,870,909 B2 | 3/2005 | Gross et al. |
| 6,895,084 B1 | 5/2005 | Saylor et al. |
| 6,895,257 B2 | 5/2005 | Boman et al. |
| 6,895,310 B1 | 5/2005 | Brock |
| 6,895,444 B1 | 5/2005 | Weisshaar et al. |
| 6,909,947 B2 | 6/2005 | Douros et al. |
| 6,917,801 B2 | 7/2005 | Witte et al. |
| 6,925,154 B2 | 8/2005 | Gao et al. |
| 6,944,679 B2 | 9/2005 | Parupudi et al. |
| 6,968,272 B2 | 11/2005 | Knockeart et al. |
| 6,970,703 B2 | 11/2005 | Fuchs et al. |
| 6,970,783 B2 | 11/2005 | Knockeart et al. |
| 6,972,669 B2 | 12/2005 | Saito et al. |
| 6,973,333 B1 | 12/2005 | O'Neil |
| 6,982,635 B2* | 1/2006 | Obradovich ...... B60W 50/0098 |
| | | 340/435 |
| 7,027,808 B2 | 4/2006 | Wesby |
| 7,031,659 B2 | 4/2006 | Tomoda et al. |
| 7,031,728 B2 | 4/2006 | Beyer, Jr. |
| 7,039,166 B1 | 5/2006 | Peterson et al. |
| 7,049,941 B2 | 5/2006 | Rivera-Cintron et al. |
| 7,049,982 B2 | 5/2006 | Sleboda et al. |
| 7,050,795 B2 | 5/2006 | Wiegand et al. |
| 7,050,834 B2 | 5/2006 | Harwood et al. |
| 7,062,286 B2 | 6/2006 | Grivas et al. |
| 7,069,118 B2 | 6/2006 | Coletrane et al. |
| 7,072,686 B1 | 7/2006 | Schrager |
| 7,085,629 B1 | 8/2006 | Gotou et al. |
| 7,091,160 B2 | 8/2006 | Dao et al. |
| 7,093,006 B2 | 8/2006 | Sanjeev et al. |
| 7,113,911 B2 | 9/2006 | Hinde et al. |
| 7,117,075 B1 | 10/2006 | Larschan et al. |
| 7,126,583 B1 | 10/2006 | Breed |
| 7,127,271 B1 | 10/2006 | Fujisaki |
| 7,151,997 B2* | 12/2006 | Uhlmann ......... G08G 1/096716 |
| | | 701/409 |
| 7,170,400 B2 | 1/2007 | Cowelchuk et al. |
| 7,187,947 B1 | 3/2007 | White et al. |
| 7,191,040 B2 | 3/2007 | Pajakowski et al. |
| 7,191,059 B2 | 3/2007 | Asahara |
| 7,197,278 B2 | 3/2007 | Harwood et al. |
| 7,203,721 B1 | 4/2007 | Ben-Efraim et al. |
| 7,212,814 B2 | 5/2007 | Wilson et al. |
| 7,221,939 B2 | 5/2007 | Ylitalo et al. |
| 7,228,224 B1 | 6/2007 | Rosen et al. |
| 7,245,905 B2 | 7/2007 | Kamdar et al. |
| 7,251,507 B2 | 7/2007 | Kitao et al. |
| 7,254,417 B2 | 8/2007 | Slemmer et al. |
| 7,257,426 B1 | 8/2007 | Witkowski et al. |
| 7,280,975 B1 | 10/2007 | Donner |
| 7,286,825 B2 | 10/2007 | Shishido et al. |
| 7,286,857 B1 | 10/2007 | Walker et al. |
| 7,287,056 B2 | 10/2007 | Loveland et al. |
| 7,289,796 B2 | 10/2007 | Kudoh |
| 7,292,152 B2 | 11/2007 | Torkkola et al. |
| 7,296,066 B2 | 11/2007 | Lehaff et al. |
| 7,305,255 B2 | 12/2007 | Brass et al. |
| 7,308,341 B2 | 12/2007 | Schofield et al. |
| 7,317,974 B2 | 1/2008 | Luskin et al. |
| 7,324,833 B2 | 1/2008 | White et al. |
| 7,346,374 B2 | 3/2008 | Witkowski et al. |
| 7,356,474 B2 | 4/2008 | Kumhyr |
| 7,363,229 B2 | 4/2008 | Falcon et al. |
| 7,366,795 B2 | 4/2008 | O'neil et al. |
| 7,383,983 B2 | 6/2008 | Gaumond et al. |
| 7,386,376 B2* | 6/2008 | Basir ...................... G07C 5/085 |
| | | 701/32.2 |
| 7,400,879 B2 | 7/2008 | Lehaff et al. |
| 7,406,340 B2 | 7/2008 | Juengling et al. |
| 7,412,078 B2 | 8/2008 | Kim |
| 7,412,328 B2* | 8/2008 | Uhlmann ......... G08G 1/096888 |
| | | 701/484 |
| 7,426,467 B2 | 9/2008 | Nashida et al. |

(56)           References Cited

U.S. PATENT DOCUMENTS

| | | | |
|---|---|---|---|
| 7,426,647 B2 | 9/2008 | Fleck et al. | |
| 7,426,689 B2 | 9/2008 | Simonds et al. | |
| 7,444,286 B2 | 10/2008 | Roth et al. | |
| 7,461,344 B2 | 12/2008 | Young et al. | |
| 7,493,645 B1 | 2/2009 | Tranchina | |
| 7,496,514 B2 | 2/2009 | Ross et al. | |
| 7,505,759 B1 | 3/2009 | Rahman | |
| 7,505,784 B2 | 3/2009 | Barbera | |
| 7,505,951 B2 | 3/2009 | Thompson et al. | |
| 7,519,399 B2 | 4/2009 | Suzuki | |
| 7,526,431 B2 | 4/2009 | Roth et al. | |
| 7,542,787 B2 | 6/2009 | Zhang et al. | |
| 7,551,063 B2 | 6/2009 | Inbarajan | |
| 7,554,435 B2 | 6/2009 | Tengler et al. | |
| 7,565,230 B2 | 7/2009 | Gardner et al. | |
| 7,567,542 B2 | 7/2009 | Rybak et al. | |
| 7,612,528 B2 | 11/2009 | Baarman et al. | |
| 7,643,619 B2 | 1/2010 | Jung | |
| 7,646,296 B2 | 1/2010 | Ohki | |
| 7,653,545 B1 | 1/2010 | Starkie | |
| 7,663,502 B2 | 2/2010 | Breed | |
| 7,672,436 B1 | 3/2010 | Thenthiruperai et al. | |
| 7,689,253 B2 | 3/2010 | Basir | |
| 7,693,631 B2 | 4/2010 | Yukawa et al. | |
| 7,693,720 B2 | 4/2010 | Kennewick et al. | |
| 7,715,791 B2 | 5/2010 | Matsuda | |
| 7,720,486 B2 | 5/2010 | Ross et al. | |
| 7,738,926 B2 | 6/2010 | Michel et al. | |
| 7,738,927 B2 | 6/2010 | Ogura et al. | |
| 7,769,364 B2 | 8/2010 | Logan et al. | |
| 7,786,843 B2 | 8/2010 | Witkowski | |
| 7,787,907 B2 | 8/2010 | Zeinstra et al. | |
| 7,801,283 B2 | 9/2010 | Harwood et al. | |
| 7,814,353 B2 | 10/2010 | Naitou et al. | |
| 7,859,392 B2 | 12/2010 | Mcclellan et al. | |
| 7,864,070 B2 | 1/2011 | Witkowski et al. | |
| 7,865,309 B2 | 1/2011 | Taylor | |
| 7,881,864 B2 * | 2/2011 | Smith | G01C 21/005 |
| | | | 715/764 |
| 7,894,861 B2 | 2/2011 | Grivas et al. | |
| 7,912,186 B2 | 3/2011 | Howell et al. | |
| 7,948,969 B2 | 5/2011 | Boys et al. | |
| 7,949,330 B2 | 5/2011 | Yuhara et al. | |
| 7,983,811 B2 * | 7/2011 | Basir | G07C 5/0891 |
| | | | 340/439 |
| 8,009,025 B2 | 8/2011 | Engstrom et al. | |
| 8,015,010 B2 | 9/2011 | Basir | |
| 8,024,415 B2 | 9/2011 | Horvitz et al. | |
| 8,027,706 B2 | 9/2011 | Mannikka et al. | |
| 8,041,779 B2 | 10/2011 | Habaguchi et al. | |
| 8,060,285 B2 | 11/2011 | Chigusa | |
| 8,090,848 B2 | 1/2012 | Maes | |
| 8,126,960 B2 | 2/2012 | Obradovich et al. | |
| 8,194,536 B2 | 6/2012 | Reinold et al. | |
| 8,195,467 B2 | 6/2012 | Mozer et al. | |
| 8,218,737 B2 | 7/2012 | Odinak | |
| 8,219,666 B2 | 7/2012 | Appleby et al. | |
| 8,244,179 B2 | 8/2012 | Dua | |
| 8,289,186 B2 | 10/2012 | Osafune | |
| 8,299,907 B2 | 10/2012 | Vandenbrink et al. | |
| 8,301,108 B2 | 10/2012 | Naboulsi | |
| 8,350,721 B2 | 1/2013 | Carr | |
| 8,364,486 B2 * | 1/2013 | Basir | G10L 15/28 |
| | | | 704/254 |
| 8,531,266 B2 | 9/2013 | Shearer et al. | |
| 8,577,543 B2 * | 11/2013 | Basir | G07C 5/0833 |
| | | | 455/563 |
| 8,611,919 B2 | 12/2013 | Barnes, Jr. | |
| 8,880,133 B2 * | 11/2014 | Basir | H04W 4/90 |
| | | | 455/423 |
| 9,014,753 B2 | 4/2015 | Bergmann et al. | |
| 9,161,189 B2 | 10/2015 | Lorello et al. | |
| 9,221,399 B2 | 12/2015 | McCarthy et al. | |
| 9,269,265 B2 | 2/2016 | Ayoub et al. | |

| | | | |
|---|---|---|---|
| 9,930,158 B2 | 3/2018 | Basir | |
| 9,976,865 B2 * | 5/2018 | Basir | H04M 1/72436 |
| 10,417,298 B2 | 9/2019 | Scannell, Jr. | |
| 11,041,735 B2 * | 6/2021 | Basir | H04M 1/72436 |
| 11,563,840 B2 | 1/2023 | Basir | |
| 2001/0005854 A1 | 6/2001 | Murata et al. | |
| 2001/0021640 A1 | 9/2001 | Lappe | |
| 2001/0056345 A1 | 12/2001 | Guedalia | |
| 2002/0022453 A1 | 2/2002 | Balog et al. | |
| 2002/0032042 A1 | 3/2002 | Poplawsky et al. | |
| 2002/0041659 A1 | 4/2002 | Beswick et al. | |
| 2002/0087655 A1 | 7/2002 | Bridgman et al. | |
| 2002/0090930 A1 | 7/2002 | Fujiwara et al. | |
| 2002/0094067 A1 | 7/2002 | August | |
| 2002/0137505 A1 | 9/2002 | Eiche et al. | |
| 2002/0142803 A1 | 10/2002 | Yamamoto | |
| 2002/0165789 A1 | 11/2002 | Dudek et al. | |
| 2002/0171552 A1 | 11/2002 | Tate | |
| 2003/0001734 A1 | 1/2003 | Schofield et al. | |
| 2003/0027594 A1 | 2/2003 | Pfoertner | |
| 2003/0032460 A1 | 2/2003 | Cannon et al. | |
| 2003/0033214 A1 | 2/2003 | Mikkelsen et al. | |
| 2003/0080850 A1 | 5/2003 | Kline | |
| 2003/0109290 A1 | 6/2003 | Moffi et al. | |
| 2003/0114202 A1 | 6/2003 | Suh et al. | |
| 2003/0126216 A1 | 7/2003 | Avila et al. | |
| 2003/0147534 A1 | 8/2003 | Ablay et al. | |
| 2003/0181543 A1 | 9/2003 | Reddy et al. | |
| 2003/0182099 A1 | 9/2003 | Mocek et al. | |
| 2003/0182360 A1 | 9/2003 | Mocek et al. | |
| 2003/0202005 A1 | 10/2003 | Sadahiro | |
| 2003/0212745 A1 | 11/2003 | Caughey | |
| 2003/0220835 A1 | 11/2003 | Barnes | |
| 2003/0224760 A1 | 12/2003 | Day | |
| 2003/0227390 A1 | 12/2003 | Hung et al. | |
| 2003/0231208 A1 | 12/2003 | Hanon et al. | |
| 2003/0231550 A1 | 12/2003 | Macfarlane | |
| 2004/0001575 A1 | 1/2004 | Tang | |
| 2004/0034455 A1 | 2/2004 | Simonds et al. | |
| 2004/0034690 A1 | 2/2004 | Schmitz | |
| 2004/0058647 A1 | 3/2004 | Zhang et al. | |
| 2004/0082340 A1 | 4/2004 | Eisinger | |
| 2004/0090308 A1 | 5/2004 | Takahashi et al. | |
| 2004/0090950 A1 | 5/2004 | Lauber et al. | |
| 2004/0092253 A1 | 5/2004 | Simonds et al. | |
| 2004/0098571 A1 | 5/2004 | Falcon | |
| 2004/0102188 A1 | 5/2004 | Boyer et al. | |
| 2004/0104842 A1 | 6/2004 | Drury et al. | |
| 2004/0116106 A1 | 6/2004 | Shishido et al. | |
| 2004/0119628 A1 | 6/2004 | Kumazaki et al. | |
| 2004/0124968 A1 | 7/2004 | Inada et al. | |
| 2004/0133345 A1 | 7/2004 | Asahara | |
| 2004/0143636 A1 | 7/2004 | Horvitz et al. | |
| 2004/0145457 A1 | 7/2004 | Schofield et al. | |
| 2004/0158367 A1 | 8/2004 | Basu et al. | |
| 2004/0162064 A1 | 8/2004 | Himmelstein | |
| 2004/0180647 A1 | 9/2004 | Schwinke et al. | |
| 2004/0182576 A1 | 9/2004 | Raghava et al. | |
| 2004/0185842 A1 | 9/2004 | Spaur et al. | |
| 2004/0185902 A1 | 9/2004 | Yang | |
| 2004/0185915 A1 | 9/2004 | Ihara et al. | |
| 2004/0193420 A1 | 9/2004 | Kennewick et al. | |
| 2004/0203351 A1 | 10/2004 | Shearer et al. | |
| 2004/0203768 A1 | 10/2004 | Ylitalo et al. | |
| 2004/0204157 A1 | 10/2004 | Remboski et al. | |
| 2004/0204161 A1 | 10/2004 | Yamato et al. | |
| 2004/0243406 A1 | 12/2004 | Rinscheid | |
| 2004/0257210 A1 | 12/2004 | Chen et al. | |
| 2004/0264387 A1 | 12/2004 | Gibeau | |
| 2004/0267419 A1 | 12/2004 | Jeng | |
| 2005/0037762 A1 | 2/2005 | Gurbani et al. | |
| 2005/0046584 A1 | 3/2005 | Breed | |
| 2005/0048958 A1 | 3/2005 | Mousseau et al. | |
| 2005/0049781 A1 | 3/2005 | Oesterling | |
| 2005/0054386 A1 | 3/2005 | Chung | |
| 2005/0066207 A1 | 3/2005 | Fleck et al. | |
| 2005/0086310 A1 | 4/2005 | Kamdar et al. | |
| 2005/0088320 A1 | 4/2005 | Kovach | |
| 2005/0107132 A1 | 5/2005 | Kamdar et al. | |

(56) References Cited

U.S. PATENT DOCUMENTS

| | | | |
|---|---|---|---|
| 2005/0107944 A1 | 5/2005 | Hovestadt et al. |
| 2005/0114139 A1 | 5/2005 | Dincer |
| 2005/0114533 A1 | 5/2005 | Hullfish et al. |
| 2005/0124380 A1 | 6/2005 | Rokusek et al. |
| 2005/0130631 A1 | 6/2005 | Maguire et al. |
| 2005/0131677 A1 | 6/2005 | Assadollahi |
| 2005/0135573 A1 | 6/2005 | Harwood et al. |
| 2005/0143134 A1 | 6/2005 | Harwood et al. |
| 2005/0174217 A1 | 8/2005 | Basir et al. |
| 2005/0188038 A1 | 8/2005 | Yabe |
| 2005/0190903 A1 | 9/2005 | Viikki |
| 2005/0197767 A1 | 9/2005 | Nortrup |
| 2005/0201540 A1 | 9/2005 | Rampey et al. |
| 2005/0209852 A1 | 9/2005 | Beckert et al. |
| 2005/0221821 A1 | 10/2005 | Sokola et al. |
| 2005/0221878 A1 | 10/2005 | Van Bosch et al. |
| 2005/0230434 A1 | 10/2005 | Campbell et al. |
| 2005/0246095 A1* | 11/2005 | Banet .................. G01C 21/362 |
| | | 340/995.23 |
| 2005/0261815 A1 | 11/2005 | Cowelchuk et al. |
| 2005/0277445 A1 | 12/2005 | Bae |
| 2005/0285743 A1 | 12/2005 | Weber |
| 2005/0288190 A1 | 12/2005 | Dao et al. |
| 2005/0288926 A1 | 12/2005 | Benco et al. |
| 2006/0009885 A1 | 1/2006 | Raines et al. |
| 2006/0019713 A1 | 1/2006 | Rokusek et al. |
| 2006/0019720 A1 | 1/2006 | Kakehi |
| 2006/0030298 A1 | 2/2006 | Burton et al. |
| 2006/0052921 A1 | 3/2006 | Bodin et al. |
| 2006/0055565 A1 | 3/2006 | Kawamata et al. |
| 2006/0083358 A1 | 4/2006 | Fong et al. |
| 2006/0089176 A1 | 4/2006 | Oki |
| 2006/0089754 A1 | 4/2006 | Mortenson |
| 2006/0089755 A1 | 4/2006 | Ampunan et al. |
| 2006/0101311 A1 | 5/2006 | Lipscomb et al. |
| 2006/0135175 A1 | 6/2006 | Lundstrom et al. |
| 2006/0161312 A1 | 7/2006 | Juengling et al. |
| 2006/0195528 A1 | 8/2006 | Stroupe et al. |
| 2006/0214783 A1 | 9/2006 | Ratnakar |
| 2006/0217858 A1 | 9/2006 | Peng |
| 2006/0238320 A1 | 10/2006 | Veliu et al. |
| 2006/0258377 A1 | 11/2006 | Economos et al. |
| 2006/0271275 A1 | 11/2006 | Verma |
| 2007/0005206 A1* | 1/2007 | Zhang ................. G08G 1/09675 |
| | | 701/1 |
| 2007/0005368 A1 | 1/2007 | Chutorash et al. |
| 2007/0010942 A1 | 1/2007 | Bill |
| 2007/0016362 A1* | 1/2007 | Nelson .................. G01C 21/362 |
| | | 701/425 |
| 2007/0016813 A1 | 1/2007 | Naitou et al. |
| 2007/0038360 A1 | 2/2007 | Sakhpara |
| 2007/0042812 A1 | 2/2007 | Basir |
| 2007/0043574 A1 | 2/2007 | Coffman et al. |
| 2007/0050108 A1 | 3/2007 | Larschan et al. |
| 2007/0061301 A1* | 3/2007 | Ramer ................. G06F 16/2455 |
| 2007/0061401 A1 | 3/2007 | Bodin et al. |
| 2007/0072650 A1* | 3/2007 | Matsuda ............. H04M 1/2748 |
| | | 455/569.2 |
| 2007/0073812 A1 | 3/2007 | Yamaguchi |
| 2007/0081506 A1 | 4/2007 | Yamada |
| 2007/0082706 A1 | 4/2007 | Campbell et al. |
| 2007/0106739 A1 | 5/2007 | Clark et al. |
| 2007/0118380 A1 | 5/2007 | Konig |
| 2007/0140187 A1 | 6/2007 | Rokusek et al. |
| 2007/0162552 A1 | 7/2007 | Shaffer et al. |
| 2007/0229549 A1 | 10/2007 | Dicke et al. |
| 2007/0238491 A1 | 10/2007 | He |
| 2007/0260635 A1* | 11/2007 | Ramer ................. H04L 67/5651 |
| 2008/0004875 A1 | 1/2008 | Chengalvarayan et al. |
| 2008/0027643 A1* | 1/2008 | Basir .................... G01C 21/362 |
| | | 701/469 |
| 2008/0031433 A1 | 2/2008 | Sapp et al. |
| 2008/0037762 A1 | 2/2008 | Shaffer et al. |
| 2008/0071465 A1 | 3/2008 | Chapman et al. |

| | | | |
|---|---|---|---|
| 2008/0119134 A1 | 5/2008 | Rao |
| 2008/0132270 A1 | 6/2008 | Basir |
| 2008/0133230 A1 | 6/2008 | Herforth et al. |
| 2008/0140408 A1 | 6/2008 | Basir |
| 2008/0201135 A1 | 8/2008 | Yano |
| 2008/0220718 A1 | 9/2008 | Sakamoto et al. |
| 2008/0252487 A1 | 10/2008 | Mcclellan et al. |
| 2008/0263451 A1 | 10/2008 | Portele et al. |
| 2008/0270015 A1 | 10/2008 | Ishikawa et al. |
| 2008/0306740 A1 | 12/2008 | Schuck et al. |
| 2009/0011799 A1 | 1/2009 | Douthitt et al. |
| 2009/0099836 A1 | 4/2009 | Jacobsen et al. |
| 2009/0106036 A1 | 4/2009 | Tamura et al. |
| 2009/0124272 A1 | 5/2009 | White et al. |
| 2009/0161841 A1 | 6/2009 | Odinak |
| 2009/0176522 A1 | 7/2009 | Kowalewski et al. |
| 2009/0204410 A1 | 8/2009 | Mozer et al. |
| 2009/0259349 A1 | 10/2009 | Golenski |
| 2009/0298474 A1 | 12/2009 | George |
| 2009/0318119 A1 | 12/2009 | Basir et al. |
| 2010/0023246 A1 | 1/2010 | Zhao et al. |
| 2010/0036595 A1 | 2/2010 | Coy et al. |
| 2010/0097239 A1 | 4/2010 | Campbell et al. |
| 2010/0100307 A1 | 4/2010 | Kim |
| 2010/0130180 A1 | 5/2010 | Lim |
| 2010/0137037 A1 | 6/2010 | Basir et al. |
| 2010/0138140 A1 | 6/2010 | Okuyama |
| 2010/0159968 A1 | 6/2010 | Ng |
| 2010/0198428 A1 | 8/2010 | Sultan et al. |
| 2010/0211301 A1 | 8/2010 | Mcclellan |
| 2010/0222939 A1 | 9/2010 | Namburu et al. |
| 2010/0278048 A1 | 11/2010 | Sawaguchi |
| 2010/0280884 A1 | 11/2010 | Levine et al. |
| 2010/0287048 A1* | 11/2010 | Ramer .................... H04W 4/24 |
| | | 705/14.46 |
| 2010/0312572 A1* | 12/2010 | Ramer .................. G06Q 30/02 |
| | | 705/1.1 |
| 2011/0302253 A1 | 12/2011 | Simpson-Anderson et al. |
| 2018/0139253 A1 | 5/2018 | Ruetschi et al. |
| 2019/0128689 A1* | 5/2019 | Basir ................. H04M 1/72436 |
| 2021/0278233 A1* | 9/2021 | Basir ................... H04M 1/6091 |
| 2025/0164264 A1 | 5/2025 | Basir et al. |
| 2025/0168268 A1 | 5/2025 | Basir |

FOREIGN PATENT DOCUMENTS

| | | | |
|---|---|---|---|
| DE | 102007062958 A1 | 6/2009 |
| EP | 1049347 A1 | 11/2000 |
| EP | 1463345 A2 | 9/2004 |
| EP | 1502803 A1 | 2/2005 |
| EP | 1575225 A2 | 9/2005 |
| EP | 1701247 A2 | 9/2006 |
| EP | 1568970 B1 | 12/2006 |
| EP | 0901000 B1 | 2/2007 |
| EP | 1986170 A2 | 10/2008 |
| EP | 1840523 B1 | 3/2011 |
| GB | 2329970 B | 11/2001 |
| GB | 2366157 A | 2/2002 |
| JP | 2001343979 A | 12/2001 |
| JP | 2002171337 A | 6/2002 |
| JP | 2002176486 A | 6/2002 |
| JP | 2002237869 A | 8/2002 |
| JP | 2004252563 A | 9/2004 |
| JP | 2005084997 A | 3/2005 |
| JP | 2007085884 A | 4/2007 |
| JP | 2007107938 A | 4/2007 |
| JP | 2007192839 A | 8/2007 |
| WO | 2004073512 A1 | 9/2004 |
| WO | 2004074047 A1 | 9/2004 |
| WO | 2005004360 A1 | 1/2005 |
| WO | 2007002753 A2 | 1/2007 |
| WO | 2007081929 A2 | 7/2007 |

OTHER PUBLICATIONS

Request for Reexamination of U.S. Appl. No. 9,930,158 dated Apr. 18, 2025.

(56) References Cited

OTHER PUBLICATIONS

Automotive Telematics Textbook, An Introduction into the Technical Aspects of Automotive Telematics with Reference to Business Model and User Needs (Axel Fuchs) (Nov. 20, 2020).
Autotech Daily, Mar. 17, 2003, Chrysler Uconnect (Mar. 17, 2003).
BlackBerry 7100 Series, User Guide (Mar. 30, 2005).
Bluetooth Specification Version 1.1, Park K:12 File Transfer Profile (Bluetooth SIG) (Feb. 22, 2001).
Bluetooth Specification Version 1.1, Part K:10 Generic Object Exchange Profile (Bluetooth SIG) (Feb. 22, 2001).
Bluetooth Specification Version 1.1, Part K:8 Fax Profile (Bluetooth SIG) (Feb. 22, 2001).
Bluetooth Specification, Generic Audio/Video Distribution Profile Version 1.0 Adopted (Bluetooth Audio Video Working Group, Bluetooth SIG) (May 22, 2003).
Bluetooth Specification, Hands-Free Profile 1.5 (Car working Group, Bluetooth SIG) (Nov. 25, 2005).
Bluetooth-based Wireless Connectivity in an Automotive Environment (Rene Nusser, Rodolfo Mann Pelz) (2000).
Clarion 2006 Catalog for Car Audio, Multimedia, and Marine Products (2006).
Clarion AutoPC 310C—Owner's Manual (1998).
Clarion Owner's Manual, BLT433 (2005).
CNN Money, Billboard magazine to chart cell phone ringtones (Oct. 28, 2004).
Delphi 1999 Annual Report, Who is Delphi?, Driving Tomorrow's Technology (1999).
Delphi Automotive Systems, Audio and Mobile MultiMedia Systems, Driving Tomorrow's Technology (2000).
Delphi Automotive Systems, Communiport MPCpro (2000).
Design and Development of an Adaptive Integrated Driver-Vehicle Interface: Overview of the Aide Project (Amditis; Andreone; Polychronopoulos; Engstrom) (2005).
Emarketer, Automotive Industry Online Report, Feb. 2003 (Feb. 1, 2003).
First Monday article, Ringtones, or the auditory logic of globalization (Sumanth Gopinath) (Dec. 5, 2005).
In-Car Communication Using Wireless Technology (Marc Bechler, Jochen Schiller, Lars Wolf) (Jan. 1, 2001).
In-Vehicle Networks, Expanding Automotive Electronic Systems (Gabriel Leen, Donal Heffernan) (Jan. 1, 2002).
Motorola, "DRAFT" Developer's Guide, iO200 OEM Module, Module Description, Version 01.00-D06 (Nov. 28, 2004).
Speech Technology, Fiat Auto Selects Nuance Speech Technologies for Blue&Me (Apr. 4, 2006).
The Hansen Report on Automotive Electronics, A Business and Technology Newsletter, vol. 13, No. 5 (Jun. 1, 2000).
Toward an Open Telematics Infrastructure (IPSJ- UBI05008081) (Wonil Lee, YoungJu Tak, Wanhee Byun, YoungWood Pae) (Jun. 10, 2005).
Communication dated Jan. 11, 2021, issued by the U.S. Patent and Trademark Office in U.S. Appl. No. 17/028,237.
European Search Report for Application No. 08860046.5, dated Jun. 18, 2012.
European Search Report for EP Application No. 06752782.0, dated Mar. 1, 2010.
International Search Report for PCT Application No. PCT/CA2006/000946, dated Nov. 8, 2006.
Non-Final Office Action dated Oct. 19, 2020 by the U.S. Patent Office in U.S. Appl. No. 17/028,237.
Specification of the Bluetooth System—Covered Core Package, Version 2.0 + EDR, vol. 4, Bluetooth SIG, Inc., Nov. 4, 2004, 250 pages.
Specification of the Bluetooth System—Architecture and Terminology Overview, Version:2.0 + EDR, vol. 1, Bluetooth SIG, Inc., Nov. 4, 2004, 92 pages.
Translated Office Action Office for Japanese Application No. 2008-516087 dated Sep. 29, 2011.
USPTO, U.S. Appl. No. 15/918,301, Office Action (Feb. 2, 2021).

Value8 v. Volvo, No. 2:24-cv-00176, Dkt 63-1, Prop. Claim Const. (E.D. Tex. Feb. 20, 2025).
Value8 v. Volvo, No. 2:24-cv-00176, Dkt. 1, Complaint (E.D. Tex. Mar. 14, 2024).
Value8 v. Volvo, No. 2:24-cv-00176, Dkt. 1-2, Complaint Exhibit 2 (E.D. Tex. Mar. 14, 2024).
Value8 v. Volvo, No. 2:24-cv-00176, Dkt. 1-4, Complaint Exhibit 4 (E.D. Tex. Mar. 14, 2024).
Value8 v. Volvo, No. 2:24-cv-00176, Dkt. 63, Jt. Claim Const. (E.D. Tex. Feb. 20, 2025).
Value8 v. Volvo, No. 2:24-cv-00176, Dkt. 69, Value8 Claim Const. Br. (E.D. Tex. May 2, 2025).
Value8 v. Volvo, No. 2:24-cv-00176, Dkt. 69-3, Decl. of Scott Andrews (E.D. Tex. May 2, 2025).
Value8 v. Volvo, No. 2:24-cv-00176, Dkt. 69-7, Depo. Tr. of Otman Basir (E.D. Tex. May 2, 2025).
Value8 v. Volvo, No. 2:24-cv-00176, Dkt. 73, Volvo Claim Const. Br. (E.D. Tex. May 16, 2025).
Value8 v. Volvo, No. 2:24-cv-00176, Dkt. 73-4, Microsoft Comp. Dict. 5th Ed. (E.D. Tex. May 16, 2025).
Value8 v. Volvo, No. 2:24-cv-00176, Dkt. 73-7, Value8 Asserted Claims and Infring. Cont. (E.D. Tex. May 16, 2025).
Value8 v. Volvo, No. 2:24-cv-00176, Dkt. 74, Value8 Reply Claim Const. Br. (E.D. Tex. May 23, 2025).
AMI-C Specification, Release 2, Publication User Guide, V1.01, Automotive Multimedia Interface Collaboration, Jun. 7, 2004, 2945 pages.
2002 SAE World Congress Presentation (Henry Muyshondt, MOST Cooperation) (2002).
AMI-C Release 1 Use Cases (Jan. 1, 2001).
AMI-C Release 2 Document Descriptions (Mar. 19, 2005).
BlackBerry 7250 Wireless Handheld User Guide (Dec. 3, 2004).
BlackBerry 7290 Wireless Handheld User Guide (Nov. 3, 2004).
BMW Owner's Manual for Bluetooth Upgrade Module (2005) (2005).
BMW Telephone Users Manual for BMW Assist with Bluetooth Wireless Tehnology, E46-X3-X5-Z4 (2005-2006) (Sep. 28, 2005).
BMW Universal Bluetooth Hands-Free System (ULF) Owner's Manual (Jun. 5, 2003).
CCAP, Bluetooth Hands-Free Profile Application Guideline (Oct. 20, 2004).
Communication and Interaction Strategies in Automotive Adaptive Interfaces (Angelos Amditis) (Jan. 1, 2004).
DVD ETC Magazine, Clarion Takes DVD on the Road, Jun.-Jul. 2002 (Todd Corsair) (Jun. 1, 2002).
IBM Research Report—Safety Driver Manager (Kanevsky, Churchill, Faisman, Nahamoo, Sicconi) (Aug. 19, 2004).
IEEE, In-Vehicle Secure Wireless Personal Area Network (SWPAN) (Mahmud, Shanker) (May 1, 2006).
Microsoft Press Release, Microsoft Powering New In-Car Infotainment Experiences from Alpine, Honda, and Other Industry Partners (Jan. 5, 2006).
Microsoft Press Release, Mobile Office Preview at SEMA Showcases Microsoft's Collaborative Approach to Bringing Innovative Solutions to the Automotive Marketplace (Nov. 1, 2005).
Microsoft, Windows Automotive 5.0 Data Sheet (Dec. 1, 2005).
MIT 2005—Assessing the Opportunities and Risks of Different Short-Range Strategies for an Automotive Manufacturer (May 6, 2005).
Motorola's Quick Start Guide, HF850, Bluetooth Handsfree Car Kit (2005).
Specification of the Bluetooth System, Host Controller Interface [Transport Layer], vol. 04, Revision 1.2 (Bluetooth SIG) (Jan. 1, 2006).
The FleetNet Project, Inter-Vehicle-Communications Based on Ad Hoc Networking Principles (Franz, Hartenstein, Mauve) (2005).
U.S. Department of Transportation, Intelligent Transportation Systems Joint Program Office, Data Fusion for Delivering Advanced Traveler Information Services (May 1, 2003).
Wards Auto, PCs Merging with Cars and Trucks (Apr. 1, 1998).

(56)  References Cited

OTHER PUBLICATIONS

Wheatley, D. & Hurwitz, H., "The Use of a Multi-modal Interface to Integrate In-Vehicle Information Presentation", Driving Assessment Conference 1(2001), 93-97. doi: https://doi.org/10.17077/drivingassessment.1015 (2001).
MOST Core Compliance Test Specification, Rev 1v1.1, Jun. 2005 (Jun. 1, 2005).
Most Specification Framework, Rev 1.1 (1999).
MOST Specification, Rev 2.2, Nov. 2002 (Nov. 1, 2002).
Nokia Press Release, New Nokia Car Kit with extended feature set brings compatibility to most mobile phones that support Bluetooth Wireless Technology (Nov. 2, 2004).
Nokia Press Release, Nokia 610 car kit phone simplifies automotive communications (Oct. 28, 2003).
Nokia User's Guide, Installation Guide, 616 car kit (2004).
Nokia User's Guide, Installation Guide, 810 car phone, Issue 1 (2003).
SAE Technical Paper Series, 2002-21-0049, Portable and Embedded Wireless Devices as Conduits for Telematics Applications (Bob D'Avello and Jim Van Bosch; Motorola, Inc.) (Oct. 21, 2002).
Telematics Industry Dynamics and Strategies for Converging Technologies (Rodrigo Luis) (May 4, 2004).
Value8 v. Volvo, No. 2:24-cv-00176, Volvo IC '158 Patent Eligibility Chart (Aug. 9, 2024).
Value8 v. Volvo, No. 2:24-cv-00176, Volvo IC '840 Patent Eligibility Chart (Aug. 9, 2024).
Value8 v. Volvo, No. 2:24-cv-00176, Volvo IC Exhibit D-1 (Aug. 9, 2024).
Value8 v. Volvo, No. 2:24-cv-00176, Volvo IC Exhibit D-2 (Aug. 9, 2024).
Value8 v. Volvo, No. 2:24-cv-00176, Volvo IC Exhibit D-3 (Aug. 9, 2024).
Value8 v. Volvo, No. 2:24-cv-00176, Volvo IC Exhibit D-4 (Aug. 9, 2024).
Value8 v. Volvo, No. 2:24-cv-00176, Volvo IC Exhibit D-5 (Aug. 9, 2024).
Value8 v. Volvo, No. 2:24-cv-00176, Volvo IC Exhibit D-6 (Aug. 9, 2024).
Value8 v. Volvo, No. 2:24-cv-00176, Volvo IC Exhibit D-7 (Aug. 9, 2024).
Value8 v. Volvo, No. 2:24-cv-00176, Volvo IC Exhibit D-8 (Aug. 9, 2024).
Value8 v. Volvo, No. 2:24-cv-00176, Volvo IC Exhibit E-1 (Aug. 9, 2024).
Value8 v. Volvo, No. 2:24-cv-00176, Volvo IC Exhibit E-2 (Aug. 9, 2024).
Value8 v. Volvo, No. 2:24-cv-00176, Volvo IC Exhibit E-3 (Aug. 9, 2024).
Value8 v. Volvo, No. 2:24-cv-00176, Volvo IC Exhibit E-4 (Aug. 9, 2024).
Value8 v. Volvo, No. 2:24-cv-00176, Volvo IC State of the Art (Aug. 9, 2024).
Value8 v. Volvo, No. 2:24-cv-00176, Volvo Invalidity Cont. (Aug. 9, 2024).
Electronicdesign, Infotainment the dashboard dilemma (John Day) (Jan. 1, 2006).
Inside Microsoft Windows CE, In-depth details of the history, architecture, and ever-expanding potential of this remarkable operating system (John Murray) (1998).
Jeju Telematics website (Apr. 1, 2005).
Korea IT Times, Jeju Telematics Model City Project (Apr. 1, 2005).
Land Rover Telephone Handbook (2004).
Master Visually Windows Mobile 2003, Chapter 1 "An Introduction to Windows Mobile 2003" (Bill Landon) (Sep. 1, 2004).
Microsoft Automotive Business Unit, Bringing cars into the Digital Age (2004).
Microsoft Automotive Business Unit, Bringing cars into the Digital Age (2005).
Microsoft Press Release, Microsoft at 2004 International CES (Jan. 5, 2004).

Microsoft Press Release, Microsoft Connected Car Technology Named Best Telematics Solution of 2004 (Jun. 3, 2004).
Microsoft Press Release, Microsoft Windows CE for Automotive 3.5 Advances In-Car Computing (Dec. 5, 2001).
Microsoft Windows CE, Communications Guide, The ultimate reference and toolkit for Windows CE (1999).
Microsoft Windows CE, User Interface Services Guide, The ultimate reference and toolkit for Windows CE (1999).
Motorola brochure, MotoDriven, In Vehicle Bluetooth Solutions, crusing ahead (2005).
Motorola IHF1000 Frequently Asked Questions (Aug. 5, 2005).
Motorola IHF1000 Guide, Premium Speech-Operated Car Kit with Bluetooth Wireless Technology (2005).
Motorola V600 GSM Wireless Phone User Guide 2003 (2003).
Motorola's Bluetooth Car Kit IHF1000, Intelligent Hands-Free— An Amazing new way to make calls in your car. (2004).
Motortrend.com, Microsoft Brings Web Services and Bluetooth to Cars Worldwide (Apr. 28, 2003).
Nokia 6600 Phone User Guide 2004 (2004).
Nokia 7610 Phone User Guide 2004 (2004).
Nokia User's Guide, Installation Guide, Nokia 610 Car Kit Phone, Issue 1 (2004).
WindowsforDevices.com, Microsoft renames embedded automotive OS (Oct. 21, 2002).
Value8 v. Ford, No. 2:25-cv-00706, Dkt. 1 (Complaint) (E.D. Tex. Jul. 11, 2025).
Value8 v. Ford, No. 2:25-cv-00706, Dkt. 1-3 (Complaint Ex. 3 Infringement Claim Chart) (E.D. Tex. Jul. 11, 2025).
Value8 v. Ford, No. 2:25-cv-00706, Dkt. 1-5 (Complaint Ex. 5 Infringement Claim Chart) (E.D. Tex. Jul. 11, 2025).
CNN Money, Ring, ring ka-ching! (Paul R. La Monica) (Jun. 17, 2004).
EDN, T-Mobile's PocketPC Phone Edition: Are We There Yet? (Sep. 5, 2002).
First Monday, Ringtones, or the auditory logic of globalization (Sumanth Gopinath) (Dec. 5, 2005).
Harbluk, J. & Lalande, S., "Performing E-mail Tasks While Driving: The Impact of Speech-Based Tasks on Visual Detection", Driving Assessment Conference 3(2005), 311-317. doi: https://doi.org/10.17077/drivingassessment. 1178 (2005).
IEEE Standard for Information Technology-Telecommunications and information exchange between systems-Local and metropolitan area networks-Specific requirements, Part 15.1: Wireless medium access control (MAC) and physical layer (PHY) specifications for wireless personal area networks (WPANs) (Jun. 14, 2005).
ITU Internet Report, The Internet of Things, Nov. 2005 (Nov. 1, 2005).
Microsoft Windows 2000 Professional, Expert Companion, Tips, Tricks, and Utilities for the Power User (Craig Stinson, Carl Siechert) (2000).
Nokia 9500 Communicator User Guide, Issue 4 (2005).
Nokia User's Guide, Installation Guide, Nokia 616 Car Kit (2006).
Nokia's Advanced Car Kit CK-7W, User's Guide, Installation Guide (Apr. 16, 2004).
O2 Xda IIs User Guide (Sep. 13, 2004).
O2, A quick guide to your Xda Exec (Jul. 1, 2005).
OnStar Owner's Guide, Gen5 (2003).
OSGi Service Platform—Release 3 (Mar. 1, 2003).
OSGi Service Platform Service Compendium—Release 4 (Aug. 1, 2005).
Parrot CK3000 User Manual (Oct. 31, 2003).
Parrot CK3100 User's Guide (Jul. 2, 2004).
Parrot CK3200 Hands-free Car Kit (Part 1 of 2) (Feb. 1, 2006).
Parrot CK3200 Hands-free Car Kit (Part 2 of 2) (Feb. 1, 2006).
Parrot SAT-3500 Hands-free Car Kit User Manual (Dec. 29, 2005).
Pioneer Operation Manual, HDD Multimedia AV Navigation Server, ACIV-Z1 (2006).
Sony Ericsson s700i User Guide (Jun. 1, 2004).
System-on-chip Semiconductor Solution and Reference Platform for Automotive Information Networks, Hitachi Review, vol. 52 (2003) (2003).
The Auto Channel, Visteon Corporation Showcases Telematics Technology For Its World Congress 2000 (Nov. 6, 2000).

(56) References Cited

OTHER PUBLICATIONS

The Network Vehicle—A Glimpse into the Future of Mobile Multi-Media (Lind, Schumacher, Reger, Olney, Yen, Laur) (1998).

The New Yorker, Ring My Bell (Sasha Frere-Jones) (Feb. 27, 2005).

Windows Embedded, Product Lifecycles, Maximize your investments and strategically plan for the future (Microsoft) (Jun. 5, 2013).

Communication dated Aug. 21, 2025, issued by the U.S. Patent and Trademark Office in U.S. Appl. No. 19/263,075.

Communication dated Sep. 3, 2025, issued by the U.S. Patent and Trademark Office in U.S. Appl. No. 19/262,898.

2004 Chrysler Pacifica User Manual (2004).

2005 Buick LeSabre Owner Manual (2005).

2006 Acura RL—Interior Overview (2006).

About the OSGi Service Platform—Technical Whitepaper (OSGi Alliance) (Jul. 12, 2004).

AMI-C—Press Kit Apr. 2003 (Apr. 15, 2003).

AMI-C Informer—Aug. 2003 (Aug. 1, 2003).

AMI-C Informer—Jan. 2004 (Jan. 1, 2004).

AMI-C Informer—Jun. 2002 (Jun. 1, 2002).

AMI-C Informer—Jun. 2004 (Jun. 1, 2004).

AMI-C Informer—May 2003 (May 1, 2003).

AMI-C Informer—Nov. 2004 (Nov. 1, 2004).

AMI-C Informer—Sep. 2001 (Sep. 1, 2001).

AMI-C Informer—Sep. 2002 (Sep. 1, 2002).

AMI-C, 2002 Digital Car Conference; Panel Discussions on Networking the Telematics Vehicle: Application Experience with MOST (Henry Muyshondt, MOST Corp.) (2002).

An Adaptive In-Vehicle Multimedia Recommender for Group Users (Yu Zhiwen, Zhou Xingshe, Zhang Daqing) (Jun. 1, 2005).

An Overview of BlueTooth Technology—IBM; IEEE Communications Magazine, Dec. 2001 (Dec. 1, 2001).

BMW Owner's Manual for Vehicle, 525i/530i/545i, Online Edition for Part-No. 01 41 0 158 518 (Sep. 1, 2004).

CNET, Auto makers add PC technology (Feb. 23, 1998).

CNN Money Magazine, A PC in your car? Why? GM, Ford, Intel, Microsoft, Netscape, Sun, and IBM think you want to cruise the Net and the Interstate simultaneously. But they don't yet have a killer app (Sep. 7, 1998).

Master Thesis in Interaction Design, A Bluetooth User Interface in the Car—A Design Proposal for the Volvo Car Environment (Maria Larsson) (2004).

Microsoft Windows 2000 Server Distributed Systems Guide, Part No. 097-0001948 (2000).

User Manual, Saab Infotainment Systems, Saab Automobile AB 2004 (93USSPSEINFOM05.book) (Mar. 16, 2004).

Windows Automotive 4.2 Data Sheet (Microsoft) (2003).

"Windows Mobile for Automotive": A Platform for Smart Telematics Systems (Edward Lansinger) (2004).

2006 Chrysler Pacifica (2006).

AMI-C 1001—Use Cases (Jan. 31, 2003).

AMI-C 1002—System Requirements, v1.00 (Jan. 31, 2003).

AMI-C 1003—Release 2 Architectural Overview (Feb. 25, 2003).

AMI-C 2002—Common Message Set (Mar. 7, 2003).

AMI-C 2003—Vehicle Interface Requirements (Feb. 28, 2003).

AMI-C 3002-1—Bluetooth Hands-Free Profile Test Specification (Mar. 14, 2003).

AMI-C 3002-2—Bluetooth Hands-Free Profile Reference Implementation (Mar. 7, 2003).

AMI-C 4001—Physical Specification (Feb. 28, 2003).

AMI-C Informer—Jul. 2003 (Jul. 1, 2003).

AMI-C Release 1—Technical Glossary (Jan. 1, 2001).

AMI-C Release 1—Vehicle Interface Specification (Jan. 1, 2001).

AMI-C Release 1 Architecture Spec (Jan. 1, 2001).

AMI-C Release 1 Common Message Set (Jan. 1, 2001).

AMI-C Release 1 Functional Specifications (Jan. 1, 2001).

AMI-C Release 1 OEM to IDB-C Gateway Specification (Jan. 1, 2001).

AMI-C, Implementation Tools Available for AMI-C Software Specs, Specs offer significant savings in software development (Jul. 30, 2003).

BlackBerry Wireless Handheld User Guide (7730 and 7780) (Nov. 7, 2003).

BMW Owner's Manual for Vehicle, 328i/335i (2006).

Business Wire, iRadio Telematics System: A Revolution For In-Car Entertainment and Communications (Mar. 21, 2001).

Delphi brochure, We're everywhere you go. (2002).

Delphi, Cockpits and Interior Products (2002).

Microsoft Windows Security Resource Kit, Second Edition (Ben Smith, Brian Komar, et al.) (2005).

Microsoft Windows XP Professional Resource Kit, Third Edition (Charlie Russel, Sharon Crawford, et al.) (2005).

Microsoft, Accelerating the Digital Lifestyle with Microsoft Windows Mobile for Automotive (Feb. 1, 2006).

Mobiletechreview, An introduction to Windows Mobile 5.0 (Sep. 5, 2005).

Specification of the Bluetooth System, Master Table of Contents & Compliance Requirements, 2.0 + EDR (Bluetooth SIG) (Nov. 4, 2004).

T Mobile, Windows Pocket PC Phone Edition, User Manual (Jun. 27, 2002).

Volvo Press Release, Volvo Personal Communicator (VPC) (Sep. 18, 2003).

Windows Mobile 2003 Software for Smartphones Tour, Winodws Media Player (Microsoft) (Feb. 19, 2005).

Windows Mobile 2003 Software Tour Ring Tones (Microsoft) (Jan. 27, 2005).

2002 International CES presentation, High-speed Networking with MOST (The Road to Universal Automotive Electronics Connectivity (Jan. 8, 2002).

Consumer Electronics Association, CE Vision Magazine, Special Supplement, 5 Technologies to Watch (2004).

Federal Communications Commission, FCC-01-192A1—Annual Report and Analysis of Competive Market Conditions with Respect to Commercial Mobile Services, Sixth Report (Jul. 17, 2001).

Leveraging Viral Growth Inherent in Mobile Peer-to-Peer Telematics to Strategic Advantage (Erik Bue) (May 7, 2004).

MOST Content Protection Scheme—DTCP Implementation, Feb. 2001, Version 1.0-00 (Feb. 1, 2000).

MOST Cooperation—Alliance to Speed Worldwide Specifications (Herbert Hetzel, Christian Thiel); Automotive LAN Seminar; Tokyo, Japan (Oct. 22, 2002).

MOST Cooperation—Automotive LAN Seminar; Tokyo, Japan (Sep. 28, 2005).

MOST Cooperation Japan Interconnectivity Conference; Tokyo, Japan (Nov. 10, 2004) (Nov. 10, 2004).

MOST Cooperation Japan Interconnectivity Conference; Tokyo, Japan (Nov. 6, 2002) (Nov. 6, 2002).

MOST Cooperation Press Release, AMI-C working with MOSTCO to use MOST Network, Requirements for Supplier to be Common (Mar. 4, 2002).

MOST Cooperation US Interconnectivity Conference; Detroit, USA (Oct. 22, 2002).

MOST Dynamic Specification, Rev 1.1, Jan. 2005 (Jan. 1, 2005).

MOST FunctionBlock AmFm Tuner, Rev 2.4.2, Sep. 2003 (Sep. 1, 2003).

MOST FunctionBlock AudioAmplifier Rev 2.4.2, Sep. 2003 (Sep. 1, 2003).

MOST FunctionBlock AudioDiskPlayer, Rev 2.4, Sep. 2003 (Sep. 1, 2003).

MOST FunctionBlock AuxIn, Rev 2.4, May 2005 (May 1, 2005).

MOST FunctionBlock ConnectionMaster, Rev 2.4, Mar. 2005 (Mar. 1, 2005).

MOST FunctionBlock EnhancedTestability Rev 2.5, Dec. 2005 (Dec. 1, 2005).

MOST FunctionBlock GeneralFBlock, Rev 2.3.3, Sep. 2003 (Sep. 1, 2003).

MOST FunctionBlock NetBlock, Rev 2.4, Mar. 2005 (Mar. 1, 2005).

MOST FunctionBlock NetworkMaster, Rev 2.3.3, Mar. 2005 (Mar. 1, 2005).

(56) References Cited

OTHER PUBLICATIONS

MOST FunctionBlock TVTuner, Rev 2.3.2, Sep. 2003 (Sep. 1, 2003).
MOST Interconnectivity Conference; Tokyo, Japan (Jun. 14, 2000) (Jun. 14, 2000).
MOST Japan Interconnectivity Conference; Tokyo, Japan (Nov. 15, 2005) (Nov. 15, 2005).
MOST MSC Cookbook, Rev 1.2, Apr. 2005 (Apr. 1, 2005).
MOST Organizational Procedures, Rev 3.2, Jun. 2005 (Jun. 1, 2005).
MOST Presentation—News and Events 2000 and 2001 (2002).
MOST Specification, Rev 2.4, May 2005 (May 1, 2005).
Windows Mobile 2003 Software for Smartphones Tour Menu (Microsoft) (Feb. 8, 2005).
Windows Mobile 2003 Software for Smartphones Tour, ActiveSync (Microsoft) (Feb. 10, 2005).
Windows Mobile 2003 Software for Smartphones Tour, Calendar (Microsoft) (Feb. 10, 2005).
Windows Mobile 2003 Software for Smartphones Tour, Contacts and ActiveSync (Microsoft) (Feb. 10, 2005).
Windows Mobile 2003 Software for Smartphones Tour, Customization (Microsoft) (Feb. 9, 2005).
Windows Mobile 2003 Software for Smartphones Tour, Infrared Beaming (Microsoft) (Feb. 10, 2005).
Windows Mobile 2003 Software for Smartphones Tour, Mobile E-Mail, Text Messaging and More (Microsoft) (Feb. 10, 2005).
Windows Mobile 2003 Software for Smartphones Tour, MSN Messenger (Microsoft) (Feb. 8, 2005).
Windows Mobile 2003 Software for Smartphones Tour, Pocket Internet Explorer (Microsoft) (Feb. 10, 2005.
Windows Mobile 2003 Software for Smartphones Tour, Pocket Outlook (Microsoft) (Feb. 10, 2005).
Windows Mobile 2003 Software for Smartphones Tour, Security (Microsoft) (Feb. 10, 2005).
Windows Mobile 2003 Software for Smartphones Tour, Tasks (Microsoft) (Feb. 10, 2005).
Windows Mobile 2003 Software for Smartphones Tour, Windows Mobile-based (Microsoft) (Feb. 8, 2005).
Windows Mobile 2003 Software Tour Menu (Microsoft) (Jan. 27, 2005).
Windows Mobile 2003 Software Tour, Always Up-to-Date Calendar, Contacts, and E-Mail (Microsoft) (Feb. 6, 2005).
Windows Mobile 2003 Software Tour, Call Barring (Microsoft) (Jan. 27, 2005).
Windows Mobile 2003 Software Tour, Call Mute (Microsoft) (Feb. 6, 2005).
Windows Mobile 2003 Software Tour, Connectivity Notifications (Microsoft) (Feb. 9, 2005).
Windows Mobile 2003 Software Tour, Constant Data Connections (Microsoft) (Jan. 14, 2005).
Windows Mobile 2003 Software Tour, Dual Volume Controls (Microsoft) (Feb. 9, 2005).
Windows Mobile 2003 Software Tour, Enhanced Contacts (Microsoft) (Feb. 23, 2005).
Windows Mobile 2003 Software Tour, Enhanced Messaging Support (Microsoft) (Feb. 9, 2005).
Windows Mobile 2003 Software Tour, SMS Enhancements (Microsoft) (Feb. 6, 2005).
Windows Mobile 2003 Software Tour, Windows Media Player 9 Series (Microsoft) (Feb. 6, 2005).
Windows Mobile 2003, PocketPC Mag, Nov. 2003 (Nov. 1, 2003).
Communication dated Oct. 23, 2025, issued by the U.S. Patent and Trademark Office in U.S. Appl. No. 19/262,898.
Response to Office Action in U.S. Appl. No. 19/263,075 dated Nov. 21, 2025.
USPTO, Office Action, Ex Parte Reexamination Control No. U.S. Appl. No. 90/019,919 (Dec. 9, 2025).
*Value8* v. *Ford*, No. 2:25-cv-00706, Dkt. 30 (Answer) (E.D. Tex. Dec. 5, 2025).

* cited by examiner

VEHICLE COMMUNICATION SYSTEM WITH NAVIGATION

This is a continuation of U.S. application Ser. No. 15/967, 899 filed May 1, 2018, which was filed on Jul. 30, 2007, which claims priority to U.S. Provisional Application Ser. No. 60/834,086, filed Jul. 28, 2006.

BACKGROUND OF THE INVENTION

This invention relates to a system for managing and communicating information while in a vehicle. More specifically, this invention relates to a system that integrates with a cell phone, PDA, or other mobile device to provide hands-free use of phone call, email, text messaging, and other functionality of a mobile device, and navigation.

Exchanging critical information using email, instant messaging, and other online media is essential to succeed in today's connected lifestyles and business environments. We depend on constant connectivity for important emails, timely updates, and to make sound decisions. Unfortunately, managing this online information on a mobile device or visible screen can be difficult and dangerous while driving.

In-vehicle navigation systems can be valuable tools to both find desired destinations, and to plan suitable routes. Unfortunately, trying to read directions and route information from a screen is almost as dangerous as opening up a paper map while driving.

SUMMARY OF THE INVENTION

This invention addresses this need by providing a convenient and safe hands-free interface to manage important online information, including navigation, while enhancing the driving experience. The system integrates seamlessly in a vehicle to read important information out loud, directly to the driver. A voice-based interface provides unified access to all communication needs while allowing the driver to focus their attention on the road. The enhanced navigation module uses the hands- and eyes-free interface to provide location specific guidance and interactively answer any relevant questions.

In another feature, the system provides access to location-relevant information via geographic codes, such as area codes, zip codes, etc. This provides a fast, easy way to access weather, news, or navigation information relevant to a particular area.

DETAILED DESCRIPTION OF THE PREFERRED EMBODIMENT

Figure 1:
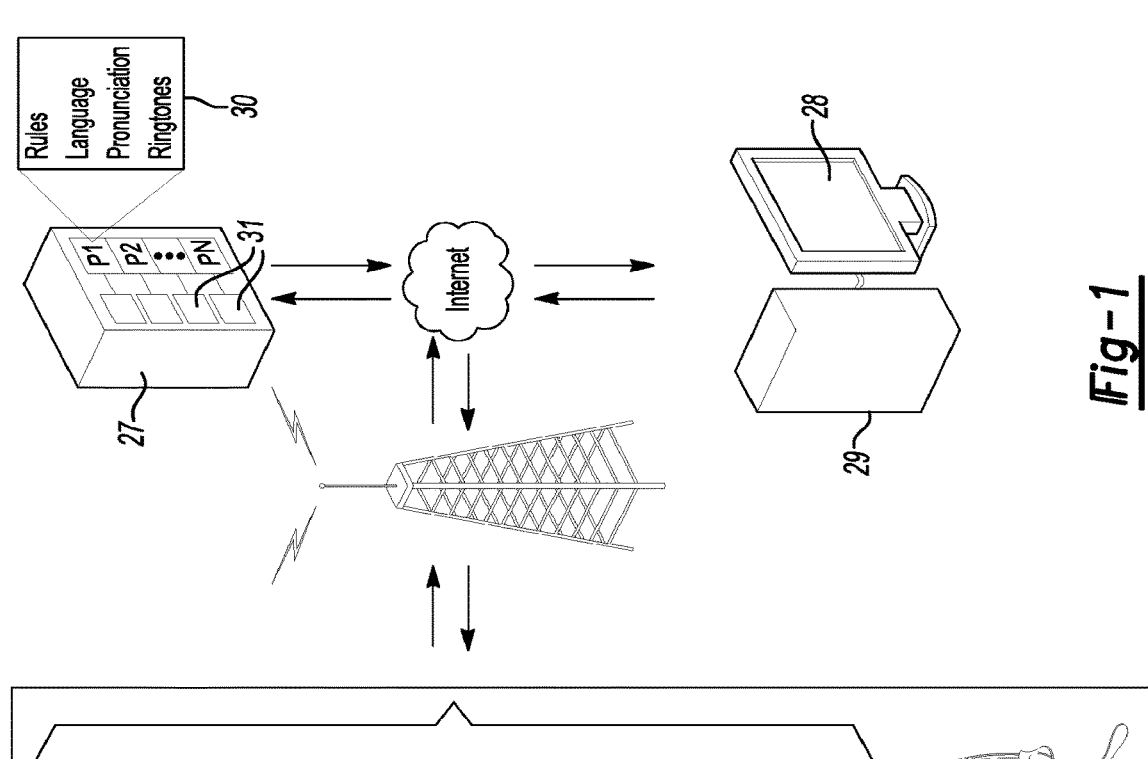
FIG. 1 schematically illustrates a communication system according to one embodiment of the present invention.

A communication system 10 is shown in FIG. 1 as implemented in a vehicle 8. The system 10 includes a device control unit 11 which is preferably mounted in a discreet location within the vehicle 8, such as under the dashboard, in the glove compartment, etc. The control unit 11 supports wireless communication via Bluetooth (IEEE 802.15.1) or any other wireless standard to communicate wirelessly with a cell phone, PDA, or other mobile device 12. All data 13 is encrypted prior to transmission. The audio output of the control unit 11 is transmitted either wirelessly 14 or through a direct, wired connection 15 to the vehicle's car stereo 16. The audio input for the control unit 11 is obtained either through a directly connected microphone 17, through an existing vehicle hands-free system, or wirelessly though a headset 18 connected to the mobile device 12.

The control unit 11 connects to the vehicle's battery 19 for power. An AC adapter is available for use at home or in the office. For portable use in other vehicles, an optional "Y" or pass-through cable is available to plug into a cigarette lighter accessory socket for power.

The control unit 11 contains a recessed button 20 which enables the driver to do the following: register new or replacement remotes; pair the device with a new mobile device 12; and clear all preferences and reset the device to its factory default settings. The control unit 11 also has a set of four status lights 21 which display the following information: power and system health, vehicle connection status and activity, mobile device connection status and activity, and information access and general status.

In one example, the control unit 11 and the mobile device 12 recognize when the user, and the user's associated mobile device 12, are near to, or have entered the vehicle. This may be accomplished, for example, by Bluetooth pairing of the device and the vehicle, or similar wireless communication initiation protocols. Within this range, the handheld device 12 changes from its normal, self-contained operating mode, to an immersive communication mode, where it is operate through the control unit 11. As will be described in more detail below, among other things, this mode enables the user to hear their emails played through the vehicle's sound system 16, or, alternatively, and if so equipped, played through the sound system of the mobile device 12, e.g., headphones 18. Microphones 17 in the vehicle 8 or on the mobile device 12 detect user-generated voice commands. Thus, the user is not required to change modes on the mobile device 12; instead, the control unit 11 and associated mobile device 12, recognize that the user is proximate the vehicle 8 and adjust the mode accordingly.

In addition to adjusting the mode based on vehicle proximity, the system 10 may adjust between a public and a private mode. For instance, as explained above, the system's immersive communication mode ordinarily occurs when the user is proximate the vehicle 8. The immersive communication mode may have a public setting and a private setting. The public setting plays the emails over headphones 18 associated with the mobile device 12. Such a setting prevents a user from disturbing other occupants of the vehicle 8. The private setting plays the emails over the vehicle sound system 16, and is ordinarily used when the user is the only occupant in the vehicle 8.

Of course, such system settings may be adjusted by the user and their particular preferences in their user profile. For example, the user may prefer to switch to the immersive communication mode when the mobile device 12 and user are within a certain distance from the vehicle 8, whereas another user may switch modes only when the mobile device 12 and user have entered the vehicle 8. Further, the user may want to operate the control unit 11 and associated device 12 in a public mode, even if other occupants are in the vehicle 8.

Similarly, the system 10 recognizes when the user leaves the vehicle 8 and the mobile device 12 reverts to a self-contained (normal) mode. The mobile device 12 may also record the vehicle's location when the user leaves the vehicle 8 (based upon GPS or other information). Accordingly, the user can recall the vehicle position at a later time, either on the device or elsewhere on the system, which may aid the user in locating the vehicle 8.

The device has multiple USB ports 22. There are standard USB ports which serve the following functions: to enable the driver to store preferences, settings, and off-line memos and transcriptions on a standard USB flash drive; to permit future expansion, upgrades, and add-on features; and to connect an Ethernet dongle for high-speed internet access. In addition, the control unit 11 has a dual-purpose USB 2.0 port which in addition to the features mentioned above, provides USB 2.0 "on-the-go" functionality by directly connecting to the USB port of a notebook computer with a standard cable (i.e. just like connecting a portable camera or GPS unit directly to a computer).

Other ports on the control unit 11 include an ⅛" audio jack 23 to connect to a car stereo without Bluetooth support, a ⅛" microphone jack 24 to support external high-quality microphones for hands-free calling, and a ⅛" stereo headset jack 25 for use away from the vehicle or in a vehicle without Bluetooth support.

The system 10 also includes an optional remote control 26 to interact with the control unit 11. The remote control contains lithium batteries, similar to that of a remote keyless entry remote for a common vehicle.

In order to provide security and privacy, the device uses both authentication and encryption. Voice-based biometrics may also be used to further enhance security.

The driver stores his or her settings for the device in their settings profile 30. This profile 30 may be stored in a database on an Internet server 27. The control unit 11 utilizes the internet access provided by the driver's mobile device 12 to download the driver's profile 30 via the Internet. The control unit 11 also uses the pairing information from the mobile device 12 to retrieve the correct profile 30 from the server 27. If the profile 30 has already been downloaded to the control unit 11, the control unit 11 may just check for changes and updates on the server 27. Each profile 30 on the server 27 contains a set of rules that the control unit 11 uses to make decisions on content delivery to the driver. The driver can access and modify their profile 30 on the Internet server 27 through either the Internet using a web-based interface 28, or through a simple interface directly accessible from the associated mobile device 12. Alternatively, the profile 30 is always stored and modified on the control unit 11 only and can be accessed via the mobile device 12 and/or via a USB connection to a laptop or desktop computer.

Figure 2:
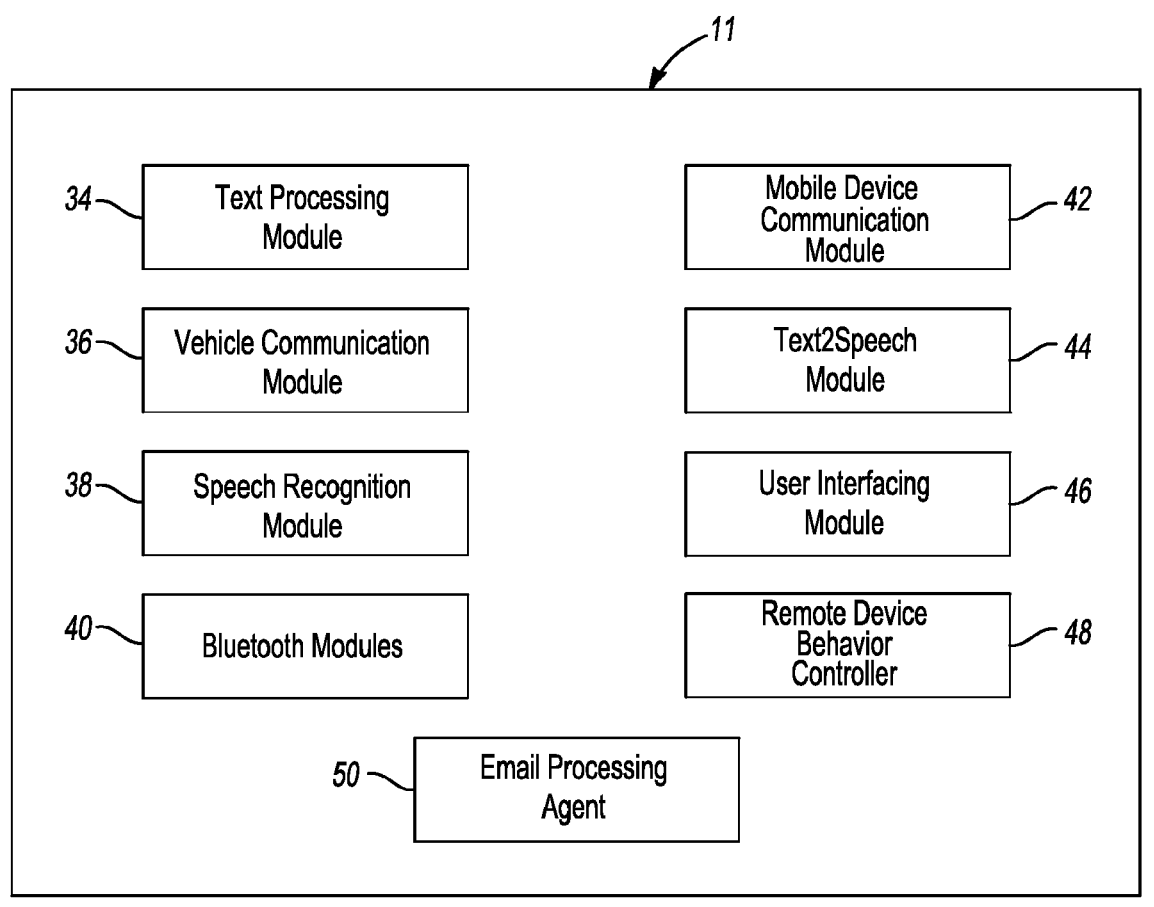
FIG. 2 illustrates some of the components of the control unit of the communication system of FIG. 1.

As shown in FIG. 2, the control unit 11 includes a text processing module 34, a vehicle communication module 36, a speech recognition module 38, Bluetooth (or other wireless communication) modules 40, a mobile device communication module 42, a text-to-speech module 44, a user interface module 46, and a remote device behavior controller 48. The control unit 11 has an email processing agent 50 that processes email messages and determines the identity of the sender, whether the message has an attachment, and if so what type of attachment, and then extracts the body-text of the message. The control unit 11 also determines if a message is a reminder, news, or just a regular email message. The control unit 11 uses a data mining algorithm to determine if any parts of the email should be excluded (e.g. a lengthy signature).

Hands-Free Email

One feature of the system is hands-free email. Using the text-to-speech module 44, the control unit 11 can read email to the driver. When new email arrives, the control unit 11 uses the profile 30 to guide an intelligent filtering and prioritization system which enables the driver to do the following: ensure that emails are filtered and read in order of priority, limit the frequency of new email interruptions, send automatic replies without driver intervention, and forward certain emails to a third-party without interruption. In addition, prior to being read out loud, the control unit 11 processes emails to optimize clarity. Part of that process involves detecting acronyms, symbols, and other more complex structures and ensuring that they can be easily understood when read. The control unit 11 provides intelligent email summarization in order to reduce the time required to hear the important content of email when read out loud.

The driver can interact with the control unit 11 using voice commands, including "go back" and "go forward," to which the control unit 11 responds by going back to the previous phrase or sentence or the next phrase or sentence in the email respectively. In addition, speaking "go back, go back" would back up two phrases or sentences.

Additional hands-free email features include a time-saving filtering system which allows the driver to hear only the most important content or meaning of an email. Another email-related feature is the ability to download custom email parsers to add a new dimension to audible email, and to parse informal email styles (i.e. 18r, ttyl).

The hands-free email functionality includes content-rich notification. When providing notification of a new email, the control unit 11 provides a quick summary about the incoming email, enabling the driver to prioritize which messages are more important. Examples include "You have mail from Sally" (similar to a caller-ID for email), or "You have an important meeting request from Cathy." The control unit 11 looks up the known contact names based upon the sender's email address in the user's address book on the mobile device 12. The control unit 11 uses known contact names to identify the parties of an email instead of just reading the cryptic email addresses out loud.

In addition to reading email, the control unit 11 also enables the driver to compose responses. The driver can send a reply using existing text or voice templates (i.e. "I'm in the car call me at 'number,'" or "I'm in the car, I will reply as soon as I can"). New emails can also be created and sent as a voice recording in the form of a .wav or .mp3 file. The driver is also provided the option of calling the sender of the email on the phone using existing contact information in the address book, or responding to meeting requests and calendar updates (i.e. Outlook). Emails can also be created as freeform text responses by dictating the contents of the email. The device then translates that into text form for email transmission. An intelligent assistant will be immediately available to suggest possible actions and to provide help as needed. Again all of these options are prompted by verbal inquires by the control unit 11 which can be selected by voice commands by the driver.

The control unit 11 supports multiple email accounts, and email can be composed from any existing account. Incoming email can also be intelligently handled and prioritized based upon account. Optional in-vehicle email addresses on a custom domain are available. Emails sent from this address would include a notification that the email was composed while in transit. When composing an email to an in-vehicle email address, the sender knows that the email will be read out loud in a vehicle. If the traditional email is "george@work.net," then the in-vehicle address may be "george@driving.net." Optional enhanced existing email addresses are also available on supported email systems. For example, if the traditional email is "george@work.com," an enhanced in-vehicle address of "george+driving@ work. com" may be selected.

Enhanced Hands-Free Telephone Calls

Another feature of this invention is enhanced hands-free telephone calls. This includes transparent use of any existing hands-free system. All incoming telephone calls can use either the existing vehicle hands-free system or a user headset 18. If an expected important email arrives while the driver is on the phone, an "email-waiting" indicator (lights and/or subtle tones) will provide subtle notification without disrupting the conversation. A headset 18 can be activated at any time for privacy or to optimize clarity. The control unit 11 will seamlessly switch from the vehicle hands-free system to the private headset 18 for privacy.

The control unit 11 also features enhanced caller-ID. The device announces incoming calls by reading the caller name or number out loud (e.g. "This is a call from John Doe, do you want to answer it?"). This eliminates the need to look away from the road to find out who is calling. Vehicle-aware screening can also automatically forward specific calls to voicemail or to another number when driving, again based upon the driver's profile. Normal forwarding rules will resume when leaving the vehicle.

The control unit 11 also provides voice activated answering and calling. When the control unit 11 announces a telephone call, the driver can accept the call using a voice command. The driver can use voice commands associated with either contacts in an address book or with spoken phone numbers to place outgoing telephone calls (i.e. "Call Krista").

Unified Information Management

Another feature of the present invention is that it provides unified information management. The control unit 11 provides a consistent interface for seamless access to incoming and outgoing telephone calls, email, and other sources of information. The existing hands-free interface automatically switches between telephone calls, reading email, and providing important notifications. When entering the vehicle, the control unit 11 automatically provides an enhanced voice-based interface, and when leaving the vehicle, the mobile device 12 automatically resumes normal operation. Email reading can also be paused to accept an incoming phone call, and can be resumed when the call is complete.

In addition, the driver can communicate with any contact through email, a phone call, or an SMS text message simply by speaking. The control unit 11 provides enhanced information for incoming telephone calls. The name and number, if available, are read out loud to ensure that the driver knows the caller without looking away from the road. A nickname, or other information located in an address book, may also be used for notification.

The driver can also reply to an email with a phone call. While reading an email, the driver can contact the sender by placing a telephone call with address book information. When a phone call is made, but the line is busy or no voicemail exists, the user is given the option of sending an email to the same contact instead. This eliminates the need to wait and try calling the person again.

Within their profile 30, the driver can prioritize between email and phone calls, so that an important email will not be interrupted by a less important phone call. In addition, custom mp3 (or other format) ring tones can be associated with both incoming emails and telephone calls. Ring tones can be customized by email from certain contacts, phone calls from certain contacts, or email about certain subjects. Custom "call waiting" audible indicators can be used when an important email arrives while on the phone, or when an important phone call arrives while reading or composing an email.

Enhanced Hands-Free Calendar

Another feature of the present invention is the enhanced hands-free calendar wherein the control unit 11 utilizes the calendar functionality of the user's mobile device 12. The control unit 11 reads the subject and time of calendar reminders out loud, and the driver can access additional calendar information with voice commands if desired. The driver can also perform in-transit schedule management by reviewing scheduled appointments (including date, time, subject, location and notes); accepting, declining, or forwarding meeting requests from supported systems (e.g. Outlook); scheduling meetings; and automatically annotating meetings with location information. The driver can also store location-based reminders, which will provide reminders the next time the vehicle is present in a specified geographical area, and automatically receive information associated with nearby landmarks. In addition, the driver could plan and resolve meeting issues by communicating directly with other participants' location-aware devices.

Do not Disturb

Another feature of the present invention is the "do not disturb" functionality. When passengers are present in the vehicle, the control unit 11 can be temporarily silenced. Even when silent, the control unit 11 will continue to intelligently handle incoming email, email forwarding, providing automatic email replies, and processing email as desired. A mute feature is also available.

Integrated Voice Memo Pad

Another feature of the present invention is the integrated voice memo pad, which enables the driver to record thoughts and important ideas while driving so they will not be forgotten while parking or searching for a memo pad or device. Memos can be transferred via email to the driver's inbox, or to any of the driver's contacts. Memos can also be wirelessly transferred to a computer desktop via the Bluetooth interface as the user arrives in the office, or transferred to a removable USB flash memory drive. Memos can also be annotated automatically using advanced context information including location, weather, and trip information. For example, "this memo was recorded at night in a traffic jam on the highway, halfway between the office and the manufacturing facility." Such augmented information can provide valuable cues when reviewing memos.

Access to Diverse Information

Another feature of the example embodiment of the present invention is the ability to access to diverse information. Information is available in audible form (text-to-speech) from a wide range of sources. First, the control unit 11 provides access to personal connectivity and time management information. This includes email (new and previously read), incoming caller name and number, SMS messages, MMS messages, telephone call logs, address book, calendar and schedule, and instant messages.

Second, the control unit 11 provides multi-format support. This includes email attachments that can be read out loud, including plain text, audio attachments (i.e., .wav, .mp3), HTML (i.e. encoded emails and web sites), plain text portions of Word and PowerPoint files, Adobe Portable Document format (PDF), OpenDocument formats, and compressed and/or encoded attachments of the above formats (i.e., .zip).

Third, the device provides environment and location awareness. This includes current location and navigation information, local weather conditions, vehicle status, and relevant location-specific information (i.e. where is "work", where is "home?").

Fourth, the control unit 11 provides remote access to information. This includes existing news sources (i.e. existing RSS feeds) and supported websites. This also includes subscription to value-added services including: weather, custom alerts (i.e. stock price triggers), traffic conditions, personalized news, e-books (not limited to audio books, but any e-book), personalized audio feeds, and personalized image or video feeds for passengers. The system obtains, translates, and provides personalized news content in audible form within a vehicle without explicit user requests. An individual may set their preferences by selecting from a set of common sources of information, or by specifying custom search criteria. When new information is available and relevant to the individual's preferences, it is read out loud to the individual when appropriate. Appropriate instances can be specified by the individual using a combination of in-vehicle presence detection, time-of-day, and importance of the information relative to other personal events including email, phone calls, meetings and text messages.

Individual preferences are fine tuned using negative feedback as specific stories and events are read out loud to the individual. This negative feedback is used in combination with the individual's personal search criteria to refine the relevance of future personalized content. In addition to online news content, the individual may also select other available online content, including stock market events and general web search terms. Some examples of personalized content include:

Weather

Custom alerts (i.e. stock price triggers)

Traffic conditions

Personalized news e-books (Not limited to audio-books, but any e-book)

Personalized audio feeds

Personalized image or video feeds for passengers

All text information is parsed and translated to optimize intelligibility before being read out loud to the individual.

Notification rules can be set by the individual using any combination of time interval, in-vehicle presence, and importance of the news event With appropriate location aware hardware support, notification rules can also include location based constraints. Desired news content can be selected using predefined templates or custom search terms.

User feedback is incorporated to maintain historical information about the news events to which the individual listens, news events that are interrupted, and news events to which the individual provides explicit feedback. This information is used to help filter subsequent news information and provide the user with more relevant news information the longer they use the service.

To minimize the volume of wireless data transfer, all searching and selection of relevant content is performed using a server with a wired data connection. Appropriate instances to present new information are detected locally (within the vehicle). When an appropriate instance occurs, a short request is sent to trigger the transmission of the most recent personalized news information from the search server.

Personalization

Another feature in the example system 10 is extensive personalization and customization for email handling, email notification, time-sensitive rules, vehicle-aware actions, text-to-speech preferences, and multiple user support.

The email handling settings in the user's profile 30 allow the driver to use the control unit's 11 built-in intelligent email parsing and processing. This enables the driver to avoid receiving notification for every trivial incoming email. Some of the intelligent parsing features include automatic replies, forwarding and prioritization based on content and sender, and substitution of difficult phrases (i.e. email addresses and web site URLs) with simple names and words. The driver can also choose to hear only select information when a new email arrives (i.e. just the sender name, or the sender and subject, or a quick summary). Email "ring tones" are also available for incoming emails based on sender or specific keywords. Prepared text or voice replies can be used to send frequently used responses (i.e. "I'm in transit right now"). Some prepared quick-responses may be used to automatically forward an email to a pre-selected recipient such as an administrative assistant. The driver can also set up both email address configuration and multiple email address rules (i.e. use "me@work.com" when replying to emails sent to "me@work.com," but use "me@mobile.com" when composing new emails).

The driver can also customize notification. This includes prioritizing emails and phone calls based on caller or sender and subject (i.e. never read emails from Ben out loud, or if an email arrives from George, it should be read before others). The driver can also limit the amount of notifications received (i.e. set minimum time between notifications, or maximum number of emails read in a short period of time).

Time-sensitive rules in the profile 30 may include options such as "don't both me in the morning," or "only notify me about incoming email between these hours." The driver can also configure audible reminder types based on calendar and scheduling items from the mobile device. Vehicle-aware actions are configurable based on the presence of the user in the vehicle. These actions include the content of automatic replies and predefined destinations and rules to automatically forward specific emails to an administrative assistant or other individual. These also include actions to take when multiple Bluetooth enabled mobile devices are present (i.e. switch to silent "do not disturb" mode, or take no action).

The text-to-speech settings for the device are also configurable. This includes speech characteristics such as speed, voice, and volume. The voice may be set to male or female, and may be set to speak a number of languages, including but not limited to US English, UK English, French, Spanish, German, Italian, Dutch, and Portuguese. A base set of languages will be provided with the device, with alternate languages being available in the future. The driver can set personal preferences for pronunciation of specific words, such as difficult contact names, and specialized acronyms or symbols, such as "$H_2O$." By default, most acronyms are spelled out letter by letter (i.e. IMS, USB).

Information about specific words or phrases can be used to enhance both speech recognition performance and text-to-speech performance, and this includes context sensitive shortcuts. For example, nicknames should be expanded into an email address if the driver is dictating an email. In addition, email addresses should be expanded to a common name when found. The driver can also set custom voice prompts or greetings.

The device also features multiple user support, wherein multiple people can share the same device. The device automatically identifies each person by their mobile device 12, and maintains individual profiles 30 for each driver.

Connectivity

The connectivity functionality of the control unit 11 enables it to function as a hands-free audio system. It interacts with supported Bluetooth hands-free devices, including but not limited to Bluetooth enabled vehicles (HS, HFP, and A2DP), after-market hands-free vehicle products, and supported headsets to provide privacy. For vehicles not containing Bluetooth or other wireless support, the control unit 11 can connect directly to the vehicle's audio system 16 through a wired connection. Retrofit solutions will also be available for existing vehicles lacking wireless connectivity in the form of an optional after-market Bluetooth kit.

The system 10 may include a remote control 26 for accessing the control unit 11. Emergency response support is available for direct assistance in emergencies, providing GPS location information if available. The driver could also use the control unit 11 through an advanced wireless audio/visual system, including such features as streaming music and providing image content (i.e. PowerPoint, images attached in emails, slideshows). Integrated steering-wheel column buttons is also an available option.

The control unit 11 can also connect to a computer and external devices. This includes personal computers with Bluetooth to conveniently exchange information over a personal area network (PAN). This also includes GPS devices (with Bluetooth or other wireless or wired connectivity) for location awareness. This also includes storage devices (Bluetooth or other wireless or wired) for personal e-book libraries, or to manage offline content with the unified hands-free interface. An optional cable will be available for controlling an iPod or other music player with voice commands. Through the device's USB ports, the driver can expand the functionality of the device by attaching such items as a USB GPRS/EDGE/3G device for direct mobile access without a separate mobile device, or a USB WiFi for high-speed Internet access.

Upgradeability and Expansion

The driver may add future enhancements to the control unit 11 wirelessly using standard Bluetooth enabled devices. This includes support for wireless transfer with a desktop or notebook computer to transfer and synchronize information. Advanced Bluetooth profile support (i.e. A2DP) for stereo and high quality audio is also available.

As mentioned previously, the control unit 11 will contain two USB ports. The standard USB port or ports will provide convenient access to standard USB devices for storing preferences on a standard USB flash drive; storing and moving off-line memos and transcriptions recorded by the device; and future expansion, upgrades, and add-on features. The dual-purpose USB 2.0 "On-The-Go" port or ports will provide both the aforementioned features to access USB devices, and also direct connections to a computer with a standard cable (i.e. just like connecting a digital camera or GPS unit directly to a computer).

Navigation

Figure 3:
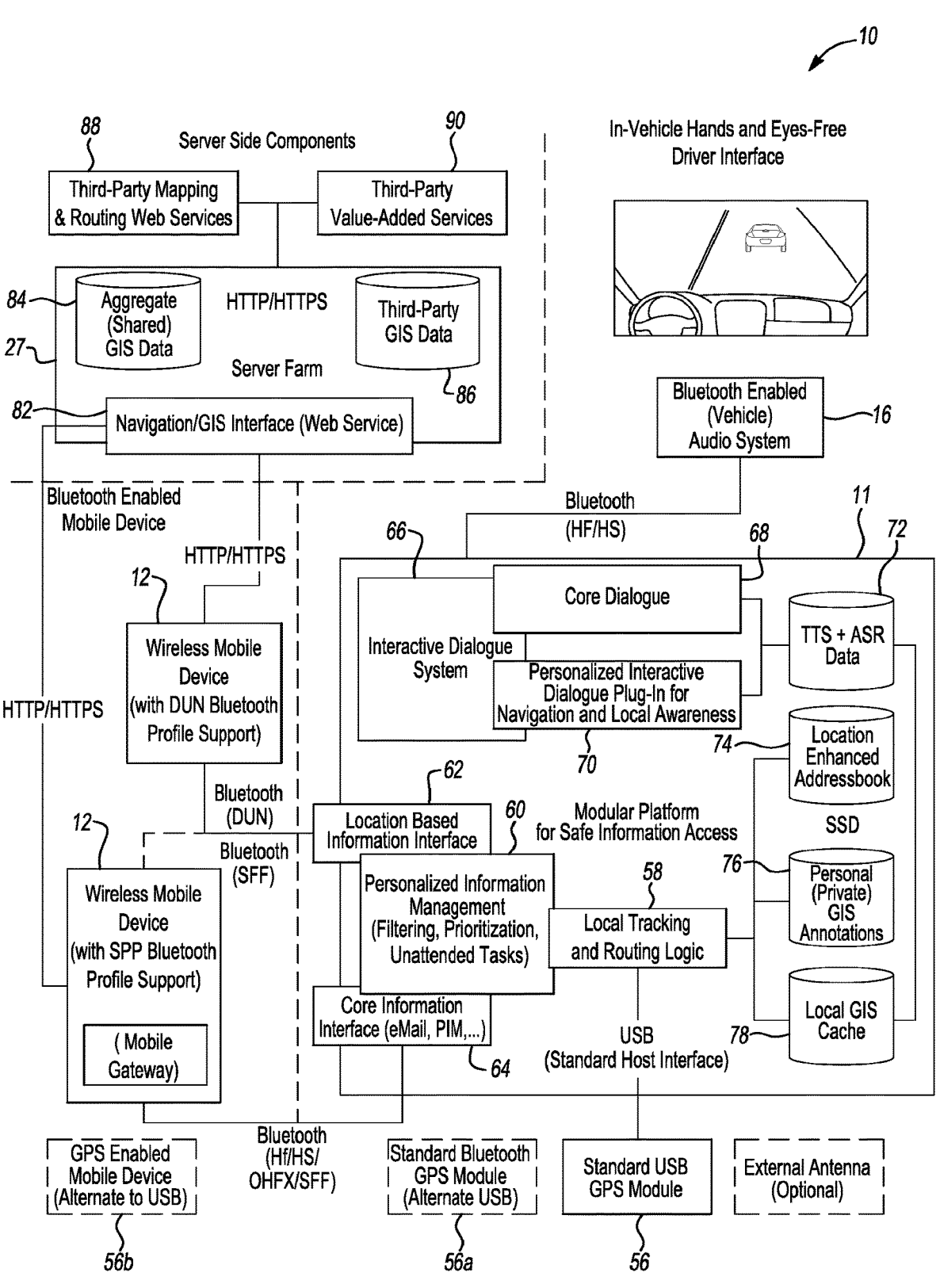
FIG. 3 is a schematic of the navigation functionality of the system of FIG. 1.

The navigation functionality of the system 10 is shown in FIG. 3. A GPS module 56 may be connected to the control unit 11 via USB. Alternatively, a Bluetooth GPS module 56*a* or a GPS module 56*b* integrated in a wireless mobile device 12 could be used to provide location, speed and heading information to the control unit 11.

The control unit 11 may include local tracking and routing logic 58 for determining the position of the control unit 11 relative to a digital map and for determining an optimal route to a desired destination.

The Personalized Information Management module 60 stores personalized settings, including rules regarding the content, timing, and verbosity of spoken directions. Prioritization allows spoken direction information to momentarily interrupt certain emails or phone calls if desired, or wait until other calls are complete. While driving, the current activity may be paused to quickly provide important spoken navigation directions. This integration is valuable to ensure an important turn is not missed because the driver was listening to the radio or incoming email. Prioritization is customizable to meet driver preferences, such as not interrupting important phone calls or emails, or interrupting only if a turn was missed. The Personalized Information Management module 60 prioritizes information from the location based information interface 62 and the core information interface 64 (e.g. email, PIM, and other features described previously). The location based information interface 62 communicates with the server 27 via the mobile device 12.

The driver can also store favorite destinations in the module 60 and retrieve them with a spoken request. An example of its use is to quickly find one's way home after getting lost, or to find the best route from an unfamiliar location to the next job site. A history of previous destinations and geographic areas is maintained to speed up future navigation requests.

The control unit 11 is capable of iterative discourse. For example, the control unit 11 converses with the driver to resolve ambiguous destinations, clarify unclear or noisy spoken commands, and request additional information when required.

The driver can find directions to new destinations by simply speaking the address. Location awareness, and use of personal preferences allows the control unit 11 to select the default local area such as town, city, province, state, or country so that the driver can simply ask for directions to an address without specifying the city when the driver is already in the area.

Directions are spoken to the driver using a natural-sounding voice. The current traveling speed, and local road network (# of lanes, posted speeds, travel restrictions, controlled intersections) is taken into account to provide unsolicited turn directions at the appropriate time in advance of the intersection. An example of these directions include, "turn left on Oak street, 3 blocks ahead", or "Turn right onto Water Street, just past the gas station".

The content and timing of spoken directions is customizable to satisfy driver preference. Some individuals may prefer to receive instructions long in advance, whereas others prefer to receive directions immediately before the next turn. This personalization feature includes options to provide all directions up front, adjust the advance notification of an upcoming turn (a function of vehicle speed and posted speed limits), to shorten or lengthen spoken directions if desired (verbose/terse).

Access to the address book in the mobile device 11 allows contacts to be referenced by name when requesting directions. This includes asking for directions to "Bob's office." Contacts without addresses, or with incomplete address information may be optionally completed using online sources when available (i.e. white pages, yellow pages, reverse phone number lookup).

Using the phone's address book together with its calendar/PIM, the control unit 11 will automatically plan driving routes to planned meetings, and provide custom responses to incoming email and phone calls. An example may include sending "I'm on my way, and plan to be there in about _____ minutes," to emails from other individuals attending the same meeting. (Estimated time to arrival is determined by the routing logic).

While talking on the phone, or listening to an email, the driver can request the control unit 11 to plan a route to meet the contact in person. Again, the control unit 11 can access the address stored in the contacts list in the mobile device 11. Relevant emails, calendar entries, and SMS information can be quickly reviewed based on the driver's planned route. Relevant information is determined based on a sender or recipient of the email working or residing at or near the driver's destination.

Maps

Geographic information (e.g. digital maps, etc.) is dynamically downloaded and updated as needed from the navigation interface 82 on the server 27, accessed via a Bluetooth enabled mobile device 12. Basic data including nearby roads, addresses, and points of interest are accessed and cached locally in the control unit 11. This approach eliminates the need to plan ahead and manually install maps appropriate for the areas the driver plans to travel through. The automatic download process ensures maps and driving directions remain up to date at all times.

Alternatively, or additionally, detailed map data for selected areas can be provided to the control unit 11 using industry-standard USB storage (flash) or other portable, removable media. This allows map data to be downloaded using a PC onto a standard storage device, and plugged directly into the host USB port (or other communication interface) or using Bluetooth or other wireless communication from the PC. Using local map data stored on a USB device eliminates the need to use wireless bandwidth for routing, but requires advance planning to ensure the data on the USB device is up to date.

Alternatively, or additionally, online map data is, by default, cached to minimize wireless bandwidth for future routing requests. Map data can also be pre-loaded using a portable storage device, and automatically updated or augmented with additional online map information as needed. This provides the benefits of reducing wireless traffic, while ensuring map information remains up to date without explicitly downloading new maps from a PC.

Map updates are transferred to the control unit 11 in compressed form, containing only the information required for the current trip with enough information to handle re-routing after some missed turns without additional server updates.

Routing

Routing can be performed in three locations: by a third-party mapping and routing service 88, on the server 27, or locally in-vehicle by tracking and routing logic 58. The flexibility of the system 10 to support these different routing options allows the driver to select an appropriate balance between wireless bandwidth and local in-vehicle processing.

Performing routing on the server 27 allows aggregate driving information, and other dynamic sources of information to be incorporated in the routing process to make informed and helpful routing decisions. This includes automatically routing around temporary construction activities or accidents to avoid unnecessary delays. Performing routing on the server 27 minimizes the information required to be present in-vehicle, and keeps wireless traffic to a minimum.

Optionally, routing information can leverage existing heuristics and algorithms provided by third-party services 88 (i.e. Google maps, mapquest).

Optionally, the routing can be performed in-vehicle. With sufficient local map data (either previously cached, or provided with external storage), routing can be quickly performed in-vehicle. This approach minimizes latency when re-routing, and can eliminate the need to use wireless bandwidth.

Third-party map data 88 is supported from both remote online sources, and in local databases 86 (hosted on the server 27) to provide flexible future licensing arrangements. The Navigation Gateway 82 is a server-side platform that provides a consistent interface to access map data, regardless of its source. This interface is required to ensure that the control unit 11 can continue to reliably access up to date map information even after changes to third party services.

In addition to map data, third-party value-added services 90 can be provided through the Gateway 82 to further help the driver. These services may include location specific audio information such as advertisements, visitor information, "self"-guided interactive driving tours (tourism). Additional services can use this same interface to provide dynamic information that can help make more informed route planning decisions, including traffic congestion updates, and road work.

Aggregate information 84 from other travelers can be used to suggest alternate points of interest. "Other travelers visiting your current destination continued on to visit locations X, Y, and Z."

Third party value-added services 90 may also provide audio advertisements. The relevance of audio advertisements can be improved by targeting drivers traveling to specific destinations, or drivers that previously visited specific types of destinations.

Third party value-added services 90 may also provide tourism information. Rather than a general information FM broadcast found in some cities and tourism regions, audio information can be provided to a driver to describe their surroundings as they travel between points of interest.

To minimize wireless data traffic, location specific information is selected, parsed and compressed before transmission from the Navigation Gateway 82 to the control unit 11 via the Bluetooth enabled mobile device 12. In situations where significant map information already resides locally on the control unit 11, only incremental changes are compressed and sent out from the Navigation Gateway 82.

Current and past driving patterns can be optionally used to predict future travel and pre-cache relevant map information on the control unit.

Aggregate data 84 about direction requests and travel patterns from numerous sources can be used to both refine routing decisions, and to select helpful location specific information. This aggregate information can include web based routing queries if available, in addition to summarized GPS tracking system information and even feedback from other drivers using the system 10.

Information Access Using Geographic Codes

In order to provide location-relevant information easily, the system 10 utilizes standard numerical codes, such as telephone area codes, local telephone exchanges, zip codes, etc. Rather than accessing a hierarchical menu of states and cities, especially when the city is unknown or uncertain, the user can simply speak the numerical code(s). This is faster and the voice-recognition is much simpler and more reliable. Additionally, this can be done indirectly, such as via the user's contact list on the mobile device 12, such that the user could specify a contact and the control unit 11 selects the appropriate numerical codes from the contact. This makes specifying geographic areas fast and easy.

These numerical geographic codes can be used to obtain location-relevant news, weather, traffic, sports, etc. For example, the user could ask, "what are the traffic conditions near James Smith?" or "What is the weather for the 248 area code?"

These numerical geographic codes can also be used with the navigation system features, such as to index points of interest. For example, the user could ask, "what are some restaurants in the 48009 zip code?" or "what are the movie show times near my office?" After listening to a few listings in that area code, the user could ask to be routed to the selected point of interest.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A vehicle comprising a controller integrated within the vehicle, the controller comprising at least one hardware processor configured to:

identify a mobile device being connected to the vehicle through a communication interface, the mobile device having Internet access;

output information using a user interface integrated within the vehicle, the information being associated with at least one third-party service which is provided to the mobile device from an external server through the Internet access of the mobile device;

receive a user command to perform the at least one third-party service through the user interface; and transmit the user command through the Internet access of the mobile device in response to receiving the user command.

2. The vehicle of claim 1, wherein the processor is further configured to control a wireless communication module to transmit the user command through the Internet access of the mobile device.

3. The vehicle of claim 2, wherein the processor is further configured to control the wireless communication module to automatically connect the controller with the mobile device.

4. The vehicle of claim 1, wherein the processor is further configured to transmit the user command through the Internet access of the mobile device using a standard Universal Serial Bus (USB) connection.

5. The vehicle of claim 1, wherein the processor is further configured to handle at least one service that is different from the at least one third-party service and comprises at least two services among messaging, phone call, music player, calendar, and navigation, and the user command comprises information to select one of the at least two services.

6. The vehicle of claim 1, wherein the user command comprises a voice command, and wherein the processor is further configured to initiate performing the at least one third-party service in response to the voice command.

7. The vehicle of claim 1, wherein the processor is further configured to handle at least one service that is different from the at least one third-party service and comprises a navigation service provided to the mobile device from the external server through the Internet access of the mobile device.

8. The vehicle of claim 7, wherein the navigation service is provided from the external server through the Internet access of the mobile device.

9. The vehicle of claim 7, wherein the processor is further configured to output information about the navigation service according to predetermined personalized features which comprises an option to adjust navigation notification.

10. The vehicle of claim 7, wherein the processor is further configured to output an option to send a message related to a navigation route to a contact included in an address book of the mobile device.

11. The vehicle of claim 1, wherein the processor is further configured to output information associated with the at least one service that is different from the at least one third-party service based on a predetermined user preference.

12. The vehicle of claim 11, wherein the user preference is preset on the mobile device.

13. The vehicle of claim 11, wherein the user preference comprises a personal setting on whether to activate a mute function of the user interface.

14. The vehicle of claim 11, wherein the user preference comprises a personal setting on which type of ring tone to use to output the information.

15. The vehicle of claim 1, wherein when a new message arrives during a phone call, the processor is configured to output temporary notification of the arrival of the new message through the user interface.

16. A method for performing at least one service by a controller integrated within a vehicle, the method comprising:

identifying a mobile device being connected to the vehicle through a communication interface, the mobile device having Internet access;

outputting information using a user interface integrated within the vehicle, the information being associated with at least one third-party service that is different from the at least one service handled by the controller, which is provided to the mobile device from an external server through the Internet access of the mobile device;

receiving a user command to perform the at least one third-party service through the user interface; and transmitting the user command through the Internet access of the mobile device in response to receiving the user command.

17. The method of claim 16, wherein the at least one service handled by the controller comprises a navigation service provided to the mobile device from the external server through the Internet access of the mobile device.

18. The method of claim 17, wherein the navigation service is provided to the mobile device from the external server through the Internet access of the mobile device.

19. The method of claim 17, wherein the method further comprises outputting information related to the navigation service according to predetermined personalized features which comprises an option to adjust navigation notification.

20. The method of claim 17, wherein the method further comprises outputting an option to send a message related to a navigation route to a contact included in an address book of the mobile device.

21. The method of claim 16, the method further comprises outputting the information associated with the at least one service based on a predetermined user preference.

22. The method of claim 21, wherein the user preference is preset on the mobile device.

23. The method of claim 21, wherein the user preference comprises a personal setting on whether to activate a mute function of the user interface.

24. The method of claim 21, wherein the user preference comprises a personal setting on which type of ring tone to use to notify the information.

25. A non-transitory computer readable medium storing a program causing a controller integrated within a vehicle to execute at least one instruction, the instruction comprising:

identifying a mobile device being connected to the vehicle through a communication interface, the mobile device having Internet access;

outputting information using a user interface integrated within the vehicle, the information being associated with at least one service which is provided to the mobile device from an external server through the Internet access of the mobile device;

receiving a user command to perform the at least one service through the user interface; and transmitting the user command through the Internet access of the mobile device in response to receiving the user command.

26. A non-transitory computer readable medium storing a program causing a mobile device having Internet access to execute at least one instruction, the instruction comprising:

identifying a controller integrated within a vehicle being connected to the mobile device through a communication interface, the controller comprising at least one hardware processor;

controlling the processor to output information using a user interface integrated within the vehicle, the information being associated with at least one service at the mobile device provided from an external server through the Internet access of the mobile device;

controlling the processor to receive a user command to perform the at least one service through the user interface; and controlling the processor to control the at least one service through the Internet access of the mobile device in response to receiving the user command.

* * * * *